US011971683B2

(12) United States Patent
Nishioka et al.

(10) Patent No.: US 11,971,683 B2
(45) Date of Patent: Apr. 30, 2024

(54) ELECTROPHOTOGRAPHIC ELECTRO-CONDUCTIVE MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Satoru Nishioka, Suntou-gun (JP); Kazuhiro Yamauchi, Suntou-gun (JP); Hiroaki Watanabe, Odawara (JP); Takumi Furukawa, Susono (JP); Yasuhiro Fushimoto, Kamakura (JP); Masahiro Kurachi, Susono (JP); Kenji Takashima, Yokohama (JP); Yuichi Kikuchi, Suntou-gun (JP); Kana Sato, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 452 days.

(21) Appl. No.: 17/486,162

(22) Filed: Sep. 27, 2021

(65) Prior Publication Data

US 2022/0011684 A1 Jan. 13, 2022

Related U.S. Application Data

(62) Division of application No. 16/828,572, filed on Mar. 24, 2020, now Pat. No. 11,169,454.

(30) Foreign Application Priority Data

Mar. 29, 2019 (JP) ................................ 2019-069096
Oct. 18, 2019 (JP) ................................ 2019-191565

(51) Int. Cl.
*G03G 5/10* (2006.01)
*G03G 5/05* (2006.01)
(Continued)

(52) U.S. Cl.
CPC ............. *G03G 5/105* (2013.01); *G03G 5/051* (2013.01); *G03G 5/06* (2013.01); *G03G 5/07* (2013.01);
(Continued)

(58) Field of Classification Search
CPC .......... G03G 5/105; G03G 5/051; G03G 5/06; G03G 5/07; G03G 5/104; G03G 15/0233; G03G 15/1685; G03G 15/75; G03G 21/18
See application file for complete search history.

(56) References Cited

U.S. PATENT DOCUMENTS 3,640,708 A 2/1972 Humphriss et al.
5,468,584 A 11/1995 Go et al.
(Continued)

FOREIGN PATENT DOCUMENTS

CN 101242469 A 8/2008
CN 101573666 A 11/2009
(Continued)

OTHER PUBLICATIONS

European Search Report dated Aug. 13, 2020 in counterpart application EP 20165807.7. (10 pages).

*Primary Examiner* — Peter L Vajda
*Assistant Examiner* — Boone Alexander Evans
(74) *Attorney, Agent, or Firm* — VENABLE LLP

(57) ABSTRACT

Provided an electrophotographic electro-conductive member that can stably suppress an occurrence of fogging in an electrophotographic image. The member comprises a support having an electro-conductive outer surface, and an electro-conductive layer on the outer surface of the support, the electro-conductive layer having a matrix including a cross-linked product of a first rubber, and domains dispersed in the matrix, the domains each includes a cross-linked
(Continued)

product of a second rubber and an electro-conductive particle, at least some of the domains is exposed to the outer surface of the electro-conductive member to constitute protrusions on an outer surface of the member, the outer surface of the electro-conductive member is constituted by the matrix and the domains exposed to the outer surface of the electrophotographic electro-conductive member, the electrophotographic electro-conductive member has an impedance of $1.0\times10^{3}\Omega$ or more and $1.0\times10^{8}\Omega$ or less, and some of the domains satisfy two specific requirements.

12 Claims, 8 Drawing Sheets

(51) Int. Cl.
*G03G 5/06* (2006.01)
*G03G 5/07* (2006.01)
*G03G 15/00* (2006.01)
*G03G 15/02* (2006.01)
*G03G 15/16* (2006.01)
*G03G 21/18* (2006.01)

(52) U.S. Cl.
CPC ......... *G03G 5/104* (2013.01); *G03G 15/0233* (2013.01); *G03G 15/1685* (2013.01); *G03G 15/75* (2013.01); *G03G 21/18* (2013.01)

(56) References Cited

U.S. PATENT DOCUMENTS 5,486,440 A 1/1996 Kashizaki et al.
5,488,461 A 1/1996 Go et al.
5,695,898 A 12/1997 Go et al.
6,070,040 A 5/2000 Goto et al.
6,697,587 B2 2/2004 Harada
7,693,457 B2 4/2010 Kuruma et al.
7,744,515 B2 6/2010 Iwamura
7,799,398 B2 9/2010 Nakamura et al.
7,835,669 B2 11/2010 Furukawa
7,962,068 B2 6/2011 Kuroda et al.
8,163,389 B2 4/2012 Hirakawa et al.
8,275,293 B2 9/2012 Ono
8,298,670 B2 10/2012 Muranaka et al.
8,426,090 B2 4/2013 Sakka
8,440,307 B2 5/2013 Nose et al.
8,445,113 B2 5/2013 Furukawa et al.
8,449,975 B2 5/2013 Hirakoso et al.
8,481,167 B2 7/2013 Watanabe et al.
8,491,994 B2 7/2013 Harada et al.
8,501,312 B2 8/2013 Watanabe et al.
8,503,916 B2 8/2013 Anan et al.
8,532,535 B2 9/2013 Nose et al.
8,538,298 B2 9/2013 Harada et al.
8,622,881 B1 1/2014 Harada et al.
8,628,854 B2 1/2014 Yamauchi et al.
8,660,472 B2 2/2014 Kurachi et al.
8,668,987 B2 3/2014 Yamauchi et al.
8,685,601 B2 4/2014 Nose et al.
8,715,830 B2 5/2014 Yamada et al.
8,741,523 B2 6/2014 Hori
8,750,762 B2 6/2014 Harada et al.
8,771,818 B2 7/2014 Nishioka et al.
8,852,743 B2 10/2014 Kikuchi et al.
8,923,732 B2 12/2014 Harada et al.
8,991,053 B2 3/2015 Watanabe et al.
9,023,465 B2 5/2015 Yamada et al.
9,086,643 B2 7/2015 Kikuchi et al.
9,128,403 B2 9/2015 Yamauchi et al.
9,146,482 B2 9/2015 Watanabe et al.
9,360,789 B1 6/2016 Masu et al.
9,360,833 B2 6/2016 Terada et al.
9,372,429 B2 6/2016 Watanabe et al.
9,442,408 B2 9/2016 Yamauchi et al.
9,442,451 B2 9/2016 Yamauchi et al.
9,541,854 B2 1/2017 Kikuchi et al.
9,547,250 B2 1/2017 Kikuchi et al.
9,551,949 B2 1/2017 Yamauchi et al.
9,556,359 B2 1/2017 Suzumura et al.
9,581,931 B2 2/2017 Yamada et al.
9,599,913 B2 3/2017 Nishioka et al.
9,639,009 B2 5/2017 Yamaguchi et al.
9,651,888 B2 5/2017 Muranaka et al.
9,665,028 B2 5/2017 Arimura et al.
9,665,029 B2 5/2017 Hino et al.
9,740,133 B2 8/2017 Yamauchi et al.
9,811,009 B2 11/2017 Yamada et al.
9,811,021 B2 11/2017 Muranaka et al.
9,897,931 B2 2/2018 Nishioka et al.
9,904,199 B2 2/2018 Terada et al.
9,910,379 B2 3/2018 Furukawa et al.
9,958,802 B2 5/2018 Kikuchi et al.
9,964,914 B2 5/2018 Arimura et al.
9,977,353 B2 5/2018 Nishioka et al.
10,012,924 B2 7/2018 Yoshidome et al.
10,018,927 B2 7/2018 Yamada et al.
10,018,934 B2 7/2018 Yamada et al.
10,108,129 B2 10/2018 Yamaguchi et al.
10,146,149 B2 12/2018 Watanabe et al.
10,280,148 B2 5/2019 Nishioka et al.
10,317,811 B2 6/2019 Tomomizu et al.
10,416,588 B2 9/2019 Masu et al.
10,545,453 B2 1/2020 Iwasaki et al.
10,558,136 B2 2/2020 Furukawa et al.
10,845,724 B2 11/2020 Kikuchi et al.
2002/0022142 A1 2/2002 Harada
2006/0142131 A1 6/2006 Iwamura
2008/0186533 A1 8/2008 Komatsu
2011/0013939 A1 1/2011 Ono
2012/0237863 A1 9/2012 Wu
2012/0308261 A1 12/2012 Tsuru et al.
2013/0195517 A1 8/2013 Jansen et al.
2013/0281276 A1 10/2013 Watanabe et al.
2014/0072343 A1 3/2014 Masu et al.
2014/0080691 A1 3/2014 Kurachi et al.
2014/0219679 A1 8/2014 Liu et al.
2015/0087489 A1 3/2015 Sato
2015/0331340 A1 11/2015 Nishioka
2015/0331342 A1 11/2015 Yamaguchi et al.
2015/0331346 A1 11/2015 Yamauchi et al.
2016/0154366 A1 6/2016 Yamauchi
2016/0266511 A1 9/2016 Kuroda
2016/0291487 A1* 10/2016 Uematsu ................ G03G 5/043
2017/0029589 A1 2/2017 Lee
2017/0090329 A1 3/2017 Yamauchi
2017/0102633 A1 4/2017 Yoshidome
2018/0024459 A1 1/2018 Kikuchi
2018/0088476 A1 3/2018 Takashima et al.
2018/0088483 A1 3/2018 Kikuchi et al.
2018/0314180 A1 11/2018 Watanabe
2019/0163119 A1 5/2019 Yamaai et al.
2020/0225593 A1 7/2020 Yamaguchi et al.
2020/0310264 A1 10/2020 Kurachi et al.
2020/0310266 A1 10/2020 Kikuchi et al.
2021/0033996 A1* 2/2021 Kikuchi ............. G03G 15/0233
2021/0041796 A1* 2/2021 Nishioka ............ G03G 15/0233

FOREIGN PATENT DOCUMENTS

CN 102203682 A 9/2011
CN 102221794 A 10/2011
CN 105652619 A 6/2016
CN 106393539 A 2/2017
CN 106896665 A 6/2017
CN 107430368 A 12/2017
CN 108803280 A 11/2018
EP 3048489 A 7/2016
EP 3073324 A 9/2016
JP 7-295340 A 11/1995
JP H09-279015 A 10/1997
JP H11-231637 A 8/1999
JP 2002-003651 A 1/2002

(56) References Cited

FOREIGN PATENT DOCUMENTS

| | | | |
|---|---|---|---|
| JP | 2005-321764 | A | 11/2005 |
| JP | 2006-30456 | A | 2/2006 |
| JP | 2006-060456 | A | 2/2006 |
| JP | 2006-207807 | A | 8/2006 |
| JP | 2007-163849 | A | 6/2007 |
| JP | 2008-292573 | A | 12/2008 |
| JP | 2011-022410 | A | 2/2011 |
| JP | 2012-163954 | A | 8/2012 |
| JP | 2013-020175 | A | 1/2013 |
| JP | 2016-018154 | A | 2/2016 |
| JP | 2017-058639 | A | 3/2017 |
| JP | 2017-072833 | A | 4/2017 |
| WO | 2015/040660 | A1 | 3/2015 |
| WO | 2015/076606 | A1 | 5/2015 |
| WO | 2019/203225 | A1 | 10/2019 |
| WO | 2019/203227 | A1 | 10/2019 |
| WO | 2019/203238 | A1 | 10/2019 |
| WO | 2019/203321 | A1 | 10/2019 |

* cited by examiner

ELECTROPHOTOGRAPHIC ELECTRO-CONDUCTIVE MEMBER, PROCESS CARTRIDGE, AND ELECTROPHOTOGRAPHIC IMAGE FORMING APPARATUS

This application is a divisional of U.S. patent application Ser. No. 16/828,572 filed Mar. 24, 2020 which claims the benefit of Japanese Patent Application No. 2019-191565, filed Oct. 18, 2019, and Japanese Patent Application No. 2019-069096, filed Mar. 29, 2019, which are hereby incorporated by reference herein in their entirety.

BACKGROUND OF THE INVENTION

Field of the Invention

The present disclosure is directed to an electrophotographic electro-conductive member, a process cartridge, and an electrophotographic image forming apparatus.

Description of the Related Art

In an image forming apparatus adopting electrophotography (hereinafter, referred to as an electrophotographic image forming apparatus), electro-conductive members such as a charging member, a transfer member, and a developing member are used. The electro-conductive member includes an electro-conductive layer coated on an outer circumferential surface of an electro-conductive support, and serves to transport a charge from the electro-conductive support to a surface of the electro-conductive member and to apply the charge to a contact object by a discharge or the like.

For example, the charging member is a member that generates a discharge between the transfer member and a photosensitive body, and charges a surface of the photosensitive body. In addition, the transfer member is a member that transfers a developer onto a printing medium or an intermediate transfer body from the photosensitive body, and stabilizes the developer after the transfer by generating a discharge.

In accordance with the demand for improving the quality of an image of the electrophotographic image forming apparatus in recent years, it is considered that a voltage applied to the electro-conductive member is increased in order to achieve a high contrast. In such a high voltage application condition, it is required for the electro-conductive member to further uniformly charge the photosensitive body, or the contact object such as the intermediate transfer body or the printing medium.

Japanese Patent Application Laid-Open No. 2002-3651 discloses a rubber composition having a sea-island structure, the rubber composition including a polymeric continuous phase formed of an ion electro-conductive rubber material, and a polymeric particulate phase formed of an electron conductive rubber material, wherein the ion electro-conductive rubber material primarily contains a raw rubber A having an intrinsic volume resistivity of $1\times10^{12}$ Ω·cm or less, and the electron conductive rubber material has electro-conductivity by containing a raw rubber B and conductive particles, and a charging member formed of the rubber composition.

SUMMARY OF THE INVENTION

An aspect of the present disclosure is directed to providing an electrophotographic electro-conductive member that can stably suppress an occurrence of "fogging" in an electrophotographic image even when a charging bias is increased.

Another aspect of the present disclosure is directed to providing a process cartridge that contributes to a stable formation of a high quality electrophotographic image. Still another aspect of the present disclosure is directed to providing an electrophotographic image forming apparatus that can stably form a high quality electrophotographic image.

According to an aspect of the present disclosure, there is provided an electrophotographic electro-conductive member, including:

a support whose outer surface is electro-conductive; and an electro-conductive layer on the outer surface of the support, the electro-conductive layer having a matrix including a cross-linked product of a first rubber, and domains dispersed in the matrix, the domains each including a cross-linked product of a second rubber and an electro-conductive particle, at least some of the domains being exposed to an outer surface of the electrophotographic electro-conductive member to constitute protrusions on an outer surface of the electrophotographic electro-conductive member, the outer surface of the electrophotographic electro-conductive member being constituted by the matrix and the domains exposed to the outer surface of the electrophotographic electro-conductive member, wherein the electrophotographic electro-conductive member has an impedance of $1.0\times10^{3}$Ω or more and $1.0\times10^{8}$Ω or less, the impedance being obtained by applying an alternating current voltage having an amplitude of 1 V and a frequency of 1.0 Hz between the outer surface of the support and a platinum electrode directly provided on the outer surface of the electrophotographic electro-conductive member under an environment of a temperature of 23° C. and a relative humidity of 50%, and wherein when defining a length of the electro-conductive layer in a longitudinal direction as L and a thickness of the electro-conductive layer as T, obtaining cross sections of the electro-conductive layer in a thickness direction thereof at three positions including a center position of the electro-conductive layer in the longitudinal direction and two positions corresponding to L/4 from both ends of the electro-conductive layer to the center of the electro-conductive layer in the longitudinal direction, and assuming that three observation areas each having a 15 μm square are arbitrary put in a thickness region of each of the cross sections, the thickness region corresponding to a region between a depth of 0.1 T and a depth of 0.9 T from the outer surface of the electro-conductive layer, 80% or more of domains observed in the respective nine observation areas in total satisfy the following requirements (1) and (2):

Requirement (1): a proportion of a cross-sectional area of the electro-conductive particle included in a domain to be judged among the domains included in the observation areas to a cross-sectional area of the domain is 20% or more; and Requirement (2): A/B is 1.00 or more and 1.10 or less, where A is a perimeter of the domain, and B is an envelope perimeter of the domain.

Further, according to another aspect of the present disclosure, there is provided a process cartridge detachably attachable to a main body of an electrophotographic image forming apparatus, wherein the electrophotographic electro-conductive member is included.

Further, according to still another aspect of the present disclosure, there is provided an electrophotographic image forming apparatus including the electrophotographic electro-conductive member.

Further features of the present invention will become apparent from the following description of exemplary embodiments with reference to the attached drawings.

DESCRIPTION OF THE EMBODIMENTS

Figure 1:
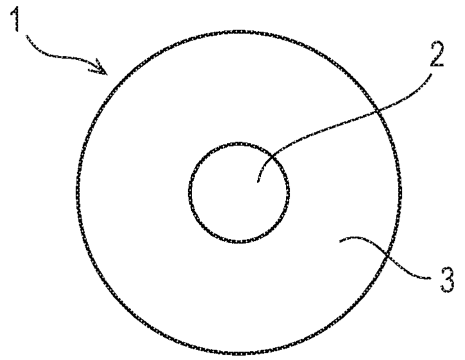
FIG. 1 is a cross-sectional view of an electrophotographic electro-conductive member according to an embodiment of the present disclosure in a direction perpendicular to a longitudinal direction of the electrophotographic electro-conductive member.

The inventors have attempted to obtain an electrophotographic image having a higher contrast when the electrophotographic image is formed by using a charging member according to Japanese Patent Application Laid-Open No. 2002-3651. Specifically, a charging bias between the charging member and an electrophotographic photosensitive body was increased to a voltage (for example, −1,500 V or higher) higher than a general charging bias (for example, −1,000 V or higher). As a result, for example, a reversed toner was also developed in a solid white portion on a photosensitive drum on which a toner was not originally developed, and thus an image with a so-called "fogging" was formed. In addition, a so-called transfer residual toner is adhered to a surface of the charging member, and a charging performance was changed over time in some cases.

The inventors have studied the reason why the charging member according to Japanese Patent Application Laid-Open No. 2002-3651 causes the fogging on the electrophotographic image when the charging bias is increased. In the process, the present inventors focused on a role of the polymeric particulate phase formed of an electron conductive rubber material in the charging member according to Japanese Patent Application Laid-Open No. 2002-3651. That is, it is considered that electron conductivity is applied to an elastic layer by an electron exchange between the polymeric particulate phase and the polymeric continuous phase present in the vicinity of the polymeric particulate phase in the elastic layer. In addition, it was presumed that the occurrence of the fogging when the charging bias is increased is caused by an electric field concentration. The electric field concentration is a phenomenon in which a current is concentrated at the time of energization at a specific portion.

That is, according to the observation of the present inventors, the polymeric particulate phase according to Japanese Patent Application Laid-Open No. 2002-3651 had a deformed shape, and unevenness was present on an outer surface of the polymeric particulate phase. The electron exchange between the polymeric particulate phases is concentrated at convex portions of the polymeric particulate phase, and thus a flow of the current becomes uneven from the vicinity of an electro-conductive support to which the charging bias of the charging member is applied to an outer surface of the charging member. Therefore, the discharge from the outer surface of the charging member to the electrophotographic photosensitive body which is a body to be charged becomes uneven, and thus a surface potential of the electrophotographic photosensitive body becomes uneven. As a result, it was presumed that the fogging occurs in the electrophotographic image.

Therefore, the present inventors were confirmed that the fogging in the electrophotographic image is effectively suppressed by eliminating a concentration point of the electron exchange between the polymeric particulate phases when the charging bias is increased. Therefore, as a result of intensive studies based on the recognition, the present inventors found that fogging in the electrophotographic image can be effectively suppressed even when a high charging bias is applied by using an electrophotographic electro-conductive member that includes a support whose outer surface is electro-conductive, and an electro-conductive layer on the outer surface of the support, and satisfies the following requirements (A) and (B).

Requirement (A):

The electro-conductive layer has a matrix including a cross-linked product of a first rubber, and domains (having sea-island structure) dispersed in the matrix. The domain includes a cross-linked product of a second rubber and an electro-conductive particle. Further, when a platinum electrode is directly provided on an outer surface of the electrophotographic electro-conductive member and an alternating current (AC) voltage having an amplitude of 1 V and a frequency of 1.0 Hz is applied between the outer surface of the support and the platinum electrode under an environment of a temperature of 23° C. and a relative humidity of 50%, an impedance is in the following range:

$1.0\times10^{3}\Omega$ or more and $1.0\times10^{8}\Omega$ or less.

Requirement (B):

When defining a length of the electro-conductive layer in a longitudinal direction as L, and a thickness of the electro-conductive layer as T, obtaining cross sections of the electro-conductive layer in a thickness direction thereof at three positions including a center position of the electro-conductive layer in the longitudinal direction and two positions corresponding to L/4 from both ends of the electro-conductive layer to the center of the electro-conductive layer in the longitudinal direction, and assuming that three observation areas each having a 15 μm square are put at arbitrary positions in a thickness region of each of the cross sections, the thickness region corresponding to a region between a depth of 0.1 T and a depth of 0.9 T from the outer surface of the electro-conductive layer, 80% or more of domains observed in nine observation areas in total satisfy the following requirements (B1) and (B2):

Requirement (B1): a proportion of a cross-sectional area of the electro-conductive particle included in a domain to be judged among the domains included in the observation areas to a cross-sectional area of the domain is 20% or more;

Requirement (B2): A/B is 1.00 or more and 1.10 or less, where A is a perimeter of the domain, and B is an envelope perimeter of the domain.

Hereinafter, the respective requirements will be described in detail.

In the requirement (A):

The requirement (A) indicates a degree of the electro-conductivity of the electro-conductive layer. The electro-conductivity of the electrophotographic electro-conductive member is in a range in which an impedance at 1 Hz is $10^3\Omega$ or more and $10\Omega$ or less. When the impedance is $10^3\Omega$ or more, it is possible to suppress the amount of discharge current from being excessively increased. As a result, a potential irregularity caused by an abnormal discharge can be prevented. In addition, when the impedance is $10^8\Omega$ or less, insufficient charging due to a shortage of the total amount of discharge current can be suppressed.

The impedance according to the requirement (A) can be measured by the following method.

When measuring the impedance, in order to eliminate an influence of a contact resistance between the charging member and a measuring electrode, it is preferable that a thin film formed of platinum is formed on the outer surface of the charging member, the thin film is used as an electrode, the electro-conductive support is used as a ground electrode, and the impedance is measured at two terminals.

As a method of forming the thin film, a method of forming a metal film by metal vapor deposition, sputtering, coating of a metal paste, and attachment of a metal tape can be used. Among them, a method of forming a thin film formed of platinum by vapor deposition is preferable in the viewpoint of reducing a contact resistance with the charging member.

When the platinum thin film is formed on the surface of the charging member, it is preferable to use a vacuum vapor deposition apparatus to which a mechanism capable of holding the charging member to the vacuum vapor deposition apparatus, and a mechanism capable of being rotated with respect to the charging member having a cylindrical cross section are applied, in consideration of easiness of the formation and uniformity of the thin film.

It is preferable that a platinum electrode having a width of about 10 mm in a longitudinal direction, which is an axial direction of a cylindrical shape, is formed on the charging member having a cylindrical cross section, and a metal sheet wound around the platinum electrode so as to be in contact with the platinum electrode is connected to the measuring electrode coming out from a measuring apparatus to perform measurement. Therefore, the impedance can be measured without a vibration of an outer diameter of the charging member or an influence on a surface shape. As the metal sheet, an aluminum foil, a metal tape, or the like can be used.

The apparatus for measuring the impedance may be an apparatus that can measure an impedance, such as an impedance analyzer, a network analyzer, or a spectrum analyzer. Among them, it is preferable that an impedance is measured from an electric resistance range of the charging member with an impedance analyzer.

Figure 3A:
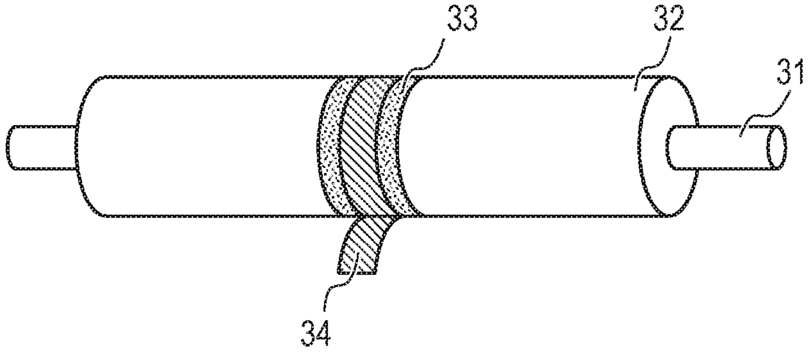
FIGS. 3A and 3B are explanatory views of impedance measurement of the electro-conductive layer of the electrophotographic electro-conductive member.
Figure 3B:
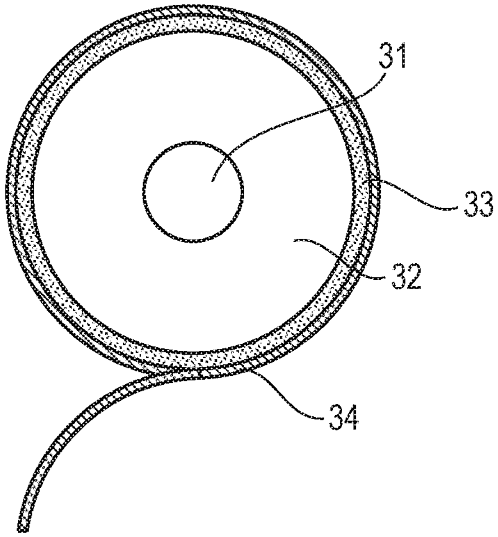

FIGS. 3A and 3B are schematic views illustrating a state in which a measuring electrode is formed on the electrophotographic electro-conductive member. In FIGS. 3A and 3B, reference numeral 31 denotes an electro-conductive support, reference numeral 32 denotes an electro-conductive layer, reference numeral 33 denotes a platinum vapor deposition layer, which is a measuring electrode, and reference numeral 34 denotes an aluminum sheet. FIG. 3A is a perspective view and FIG. 3B is a cross-sectional view. As illustrated in FIGS. 3A and 3B, it is important that the electro-conductive layer 32 is interposed between the electro-conductive support 31 and the electro-conductive layer 33 which is the measuring electrode.

In addition, the impedance is measured by connecting the measuring electrode 33 from the aluminum sheet 34 to the electro-conductive support 31 with an impedance measuring apparatus (Solartron 126096W-type dielectric impedance measuring system, manufactured by TOYO Corporation, not illustrated).

The impedance is measured at a vibration voltage of 1 Vpp and a frequency of 1.0 Hz under an environment of a temperature of 23° C. and a relative humidity of 50%, and an absolute value of the impedance is obtained.

The electrophotographic electro-conductive member is divided into five regions in the longitudinal direction, one arbitrary measurement from each of the regions is performed, and thus a total of five measurements are performed. An average value thereof is defined as an impedance of the electrophotographic electro-conductive member.

Requirement (B)

In the requirement (B1) of the requirement (B), the amount of electro-conductive particle included in each of the domains in the electro-conductive layer is measured. In addition, the requirement (B2) defines a case where the domain has a small unevenness on an outer circumferential surface thereof or the domain is free from unevenness on the outer circumferential surface thereof.

As a result of analyzing the electrophotographic electro-conductive member disclosed in Japanese Patent Application Laid-Open No. 2002-3651, it was confirmed that the domain has unevenness or has a high aspect ratio. As a result of intensive studies, it was found that fogging, which is the above problem, at the time of applying the high voltage can be remarkably suppressed by making the shape of the domain closer to a perfect circular shape with a small unevenness.

As described above, in an electro-conductive domain/non-electro-conductive matrix structure in which only the domain has electro-conductivity, domains provide the electro-conductivity, and the charge exchange is performed between domains inside the electrophotographic electro-conductive member. In a case where a convex portion is present in the domain, an electric field is concentrated at the convex portion, the charge exchange between adjacent domains is easily performed at the convex portion, and a current excessively flows at the convex portion. That is, a charge easily flows from a convex portion of a domain to a domain adjacent to the convex portion. By this phenomenon, a locally strong discharge is generated from the surface of the electrophotographic electro-conductive member, and a potential irregularity of the photosensitive body is generated when the electrophotographic electro-conductive member is used as a charging member.

That is, it is effective to make the domain close to a perfect circular shape as much as possible. In other words, it is preferable that the domain is free from unevenness.

Regarding the requirement (B1), the present inventors were obtained the finding that, when focusing on one domain, the amount of electro-conductive particle included in the domain affects an outer shape of the domain. That is, the present inventors were obtained the finding that, as a filling amount of the electro-conductive particle in one domain is increased, the shape of the domain becomes closer to a spherical shape. As the number of domains close to a spherical shape is large, a concentration point of the electron exchange between the domains can be reduced. As a result, the fogging in the electrophotographic image observed in the charging member according to Japanese Patent Application Laid-Open No. 2002-3651 can be reduced.

Therefore, according to the examination of the present inventors, based on an area of a cross section of one domain, a domain in which a proportion of a total cross-sectional area of the electro-conductive particle observed in the cross section is 20% or more has an outer shape in which the concentration of the electron exchange between the domains can be significantly alleviated. Specifically, the domain can have a shape closer to a spherical shape.

The requirement (B2) defines a degree of the presence of the unevenness including a convex portion at the outer surface of the domain, the convex portion could be a concentration point of the electron exchange between the domains.

Figure 5:
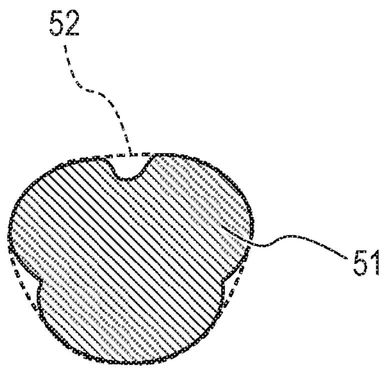
FIG. 5 is a schematic view illustrating an envelope perimeter of the domain according to the present disclosure.

That is, when a perimeter of the domain is defined as A and an envelope perimeter of the domain is defined as B, and a value (A/B) of the requirement (B2) indicating a degree of the unevenness is 1.00, the domain is free from any unevenness at the outer surface thereof, and as a result of that, the concentration of the electric field can be more firmly suppressed. Further, the more increasing the value of the requirement (B2), the more the domain has unevenness at the outer surface thereof, and therefore, the domain having a large value of the requirement (B2), results in concentration of the electric field at the convex portion of the unevenness. It was found that the value of the requirement (B2) is 1.10 or less, such that the electric field concentration caused by the convex portion of the domain can be suppressed. It should be noted that, as illustrated in FIG. 5, the envelope perimeter is a perimeter (broken line 52) when the convex portions of the domain 51 observed in the observation region are connected each other, and a perimeter of the recess is ignored.

From the above results, the present inventors found that when 80% or more of domains in the cross section of the electro-conductive layer observed in each of the nine observation areas simultaneously satisfy the requirements (A) and (B), the electric field concentration inside the electrophotographic electro-conductive member can be suppressed, and a uniform discharge can be achieved. As a result, fogging in the photosensitive body at the time of applying a high voltage by the charging member can be suppressed. It should be noted that in the requirement (B), an observation object of the domain is in a range from the outer surface of the electro-conductive layer to a depth of 0.1 T to 0.9 T from the outer surface of the electro-conductive layer in the cross section of the electro-conductive layer in a thickness direction. In that sense, it is considered that the migration of electrons from the electro-conductive support to the outer surface of the electro-conductive layer is mainly controlled by the domain present in the range.

The present inventors were further examined that the attachment of the toner to a surface of a toner that changes the charging performance of the charging member according to Japanese Patent Application Laid-Open No. 2002-3651 over time. The toner remaining on the photosensitive body even after the transfer process (hereinafter, also referred to as a "transfer residual toner") is often charged to the same polarity (positive polarity) as the polarity of a voltage in the transfer process. Therefore, the transfer residual toner that has reached to a nip portion between the photosensitive body and the charging member is electrostatically attached to the surface of the charging member. As a result, the surface of the charging member is gradually stained by the transfer residual toner, and thus a stable discharge from the surface of the charging member may be inhibited. Therefore, in order to suppress the electrostatic attachment of the transfer residual toner to the outer surface of the charging member, it is effective to invert a charge of the transfer residual toner.

Here, the inventors examined that a charge of the transfer residual toner is inverted using the electrophotographic electro-conductive member that can effectively suppress fogging in the electrophotographic image, and satisfies the requirements (A) and (B), even when a high charging bias is applied. As a result, it was found that a charge of the transfer residual toner is extremely effectively inverted by exposing at least some of the domains to the outer surface of the electrophotographic electro-conductive member to constitute protrusions on the outer surface of the electrophotographic electro-conductive member (hereinafter, also referred to as a requirement (C)), in addition to the requirements (A) and (B).

By exposing the domains on the outer surface of the electrophotographic electro-conductive member to constitute the protrusions, the transfer residual toner that has reached the nip portion between the charging member and the photosensitive drum is likely to be in physically contact with the protrusions. In addition, the positively charged transfer residual toner is electrostatically attracted to the protrusions of which a negative charge is accumulated, and therefore, a contact probability between the transfer residual toner and the protrusions is more increased. As a result of contact of the transfer residual toner with the protrusions, negative charge is injected into the transfer residual toner, and the transfer residual toner is made negative.

Further, the domain that has delivered the charge to the transfer residual toner by the contact, can stably and continuously receive the charge from another domain present in the electro-conductive layer. Therefore, it is considered that the transfer residual toner that reaches the nip portion can be made more reliably negative.

Specifically, each of the protrusions has a height of preferably 50 nm or more and 200 nm or less. When each of the protrusions has the height of 50 nm or more, the electro-conductive protrusions can be likely to be in contact with the reversed toner. In addition, when each of the protrusions has the height of 100 nm or more, the electro-conductive protrusions can be more likely to be in contact with the reversed toner, and thus fogging due to the reversed toner can be reduced. Meanwhile, since unevenness of charge derived from the protrusions is generated in a discharge region, each of the protrusions has the height of preferably 200 nm or less.

In addition, an arithmetic mean value Dm of distances between adjacent walls of the domains (hereinafter, also simply referred to as a "domain-to-domain distance Dm") of the outer surface of the electrophotographic electro-conductive member is preferably 2.00 μm or less. When the domain-to-domain distance Dm is 2.00 μm or less, the protrusions of the electro-conductive domain are more likely to be in contact with the reversed toner.

Therefore, in the case of the electrophotographic electro-conductive member, the electric field concentration in the electro-conductive layer can be suppressed by making the domain close to a perfect circular shape by the requirements (A) and (B), and the attachment of the reversed toner can be suppressed by the charge injection by the protrusions of the domain by the requirement (C). As a result, fogging can be significantly reduced even when a charging bias is increased.

<Electrophotographic Electro-conductive Member>

The electrophotographic electro-conductive member according to one embodiment of the present disclosure, in particular, an electrophotographic electro-conductive member having a roller shape (hereinafter, also referred to as an "electro-conductive roller") will be described using the drawings.

FIG. 1 is a cross-sectional view of the electro-conductive roller perpendicular to a direction along an axis of the electro-conductive roller (hereinafter, also referred to as a "longitudinal direction"). An electro-conductive roller 1 includes a cylindrical electro-conductive support 2 and an electro-conductive layer formed on an outer circumference of the support 2, that is, on an outer surface of the support.

Figure 2:
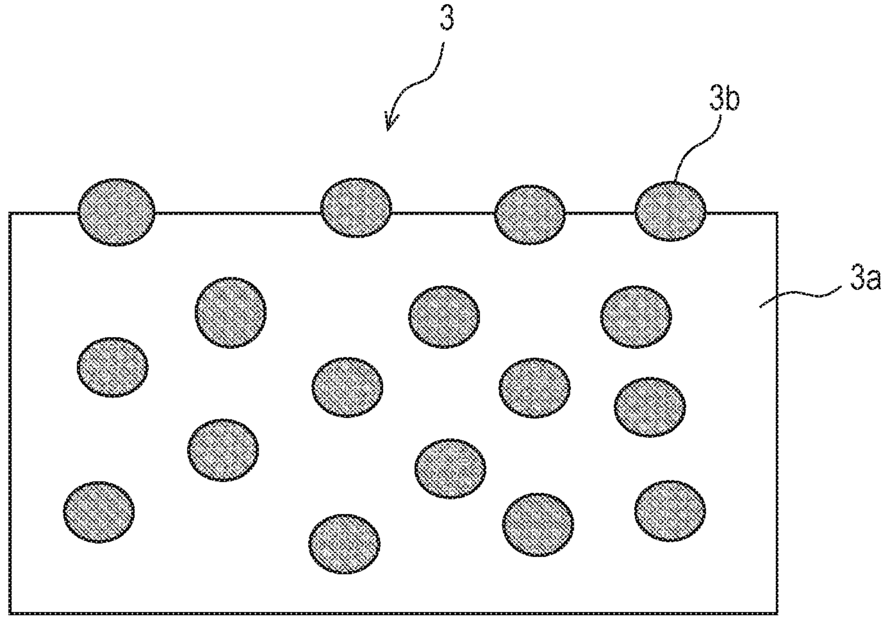
FIG. 2 is a cross-sectional view of an electro-conductive layer of the electrophotographic electro-conductive member according to the embodiment of the present disclosure in a direction perpendicular to a longitudinal direction of the electro-conductive layer.

FIG. 2 is a cross-sectional view of an electro-conductive layer 3 in a direction perpendicular to the longitudinal direction of the electro-conductive roller. The electro-conductive layer 3 has a matrix-domain structure including a matrix 3*a* and domains 3*b*. In addition, the domain 3*b* includes an electro-conductive particle (not illustrated). In addition, the domain 3*b* is partially exposed to the outer surface of the electrophotographic electro-conductive member, that is, a surface facing a body to be charged such as a photosensitive body. Furthermore, the domain 3*b* exposed to the outer surface of the electrophotographic electro-conductive member is configured to constitute protrusions on the outer surface of the electrophotographic electro-conductive member.

<Confirmation Method of Matrix-Domain Structure>

The presence of the matrix-domain structure can be confirmed as follows, for example. Specifically, a thin piece of the electro-conductive layer may be prepared from the electrophotographic electro-conductive member to carry out a detailed observation. Examples of a unit for obtaining a thin piece may include a sharp razor blade, a microtome, and FIB. In addition, in order to preferably carry out the observation of the matrix-domain structure, a pretreatment by which a preferred contrast between an electro-conductive phase and an insulating phase can be obtained, such as a dyeing treatment or a vapor deposition treatment, may be performed. The thin piece subjected to fracture surface formation and pretreatment can be observed with a laser microscope, a scanning electron microscope (SEM), or a transmission electron microscope (TEM).

The electro-conductivity of the electrophotographic electro-conductive member may be evaluated by measuring an impedance at 1 Hz, and specifically, the impedance at 1 Hz is preferably in a range of 10Ω or more and 108Ω or less. When the impedance at 1 Hz is $10^3$Ω or more, the amount of discharge current is excessively increased. As a result, a potential irregularity caused by an abnormal discharge can be prevented. When the impedance at 1 Hz is $10^8$Ω or less, insufficient charging due to a shortage of the total amount of discharge current can be suppressed.

<Electro-Conductive Support>

As a material constituting the support, a material known in the field of the electrophotographic electro-conductive member or a material that can be used as the electrophotographic electro-conductive member can be adequately selected and used. Examples of the material may include aluminum, stainless steel, a synthesis resin having electro-conductivity, a metal or an alloy such as iron and a copper alloy.

In addition, these materials may be subjected to an oxidation treatment or a plating treatment with chrome or nickel. As the type of plating, either electroplating or electroless plating can be used. The electroless plating is preferable from the viewpoint of the dimensional stability. Here, examples of the type of electroless plating to be used can include nickel plating, copper plating, gold plating, and plating with various alloys.

A thickness of the plating is preferably 0.05 μm or more, and it is preferable that the thickness of the plating is 0.10 μm or more and 30.00 μm or less in consideration of a balance between a working efficiency and a rust proof ability. The cylindrical shape of the support may be a solid cylindrical shape, and may be a hollow cylindrical shape. In addition, an outer diameter of the support is preferably in a range of 3 mm or more and 10 mm or less.

<Electro-Conductive Layer>

<Matrix>

The matrix includes a first rubber cross-linked product. The matrix preferably has a volume resistivity ρm of $1.0\times10^8$ Ω·cm or more and $1.0\times10^{17}$ Ω·cm or less.

When the volume resistivity of the matrix is $1.0\times10^8$ Ω·cm or more, the electro-conductivity of the matrix can suppress the influence on the charge exchange between the electro-conductive domains. In particular, in a case where the electro-conductivity of the matrix is high (the volume resistivity of the matrix is low) and exhibits ion conductivity, the matrix promotes the excessive charge exchange between the electro-conductive domains. In addition, in a case where an electric field concentration is generated by a small change of the domain shape, a current tends to excessively flow. Therefore, it is preferable that the matrix has the volume resistivity ρm of $1.0\times10^8$ Ω·cm or more, in order to also suppress the ion conductivity of the matrix.

When the matrix has the volume resistivity ρm of $1.0\times10^{17}$ Ω·cm or less, the electro-conductivity required for the entire electro-conductive layer can be obtained without inhibition of the charge exchange between the electro-conductive domains. Therefore, image defects caused by the shortage of the charge can be prevented.

The matrix more preferably has the volume resistivity ρm of $1.0\times10^{10}$ Ω·cm or more and $1.0\times10^{17}$ Ω·cm or less. Within this range, the influence on the ion conductivity of the matrix is suppressed, and thus the volume resistivity required for the electrophotographic electro-conductive member can be obtained. The matrix further preferably has the volume resistivity ρm of in a range of $1.0\times10^{12}$ Ω·cm or more and $1.0\times10^{17}$ Ω·cm or less. Within this range, the field concentration is strongly suppressed, and the volume resistivity required for the electrophotographic electro-conductive member can be obtained, even at the time of applying a high voltage.

<Volume Resistivity ρm of Matrix>

The volume resistivity ρm of the matrix can be calculated, for example, by cutting, from the electro-conductive layer, a thin piece having a predetermined thickness (for example, 1 μm) included in the matrix-domain structure, and bringing a fine probe of a scanning probe microscope (SPM) or an atomic force microscope (AFM) in contact with the matrix in the thin piece.

Figure 6A:
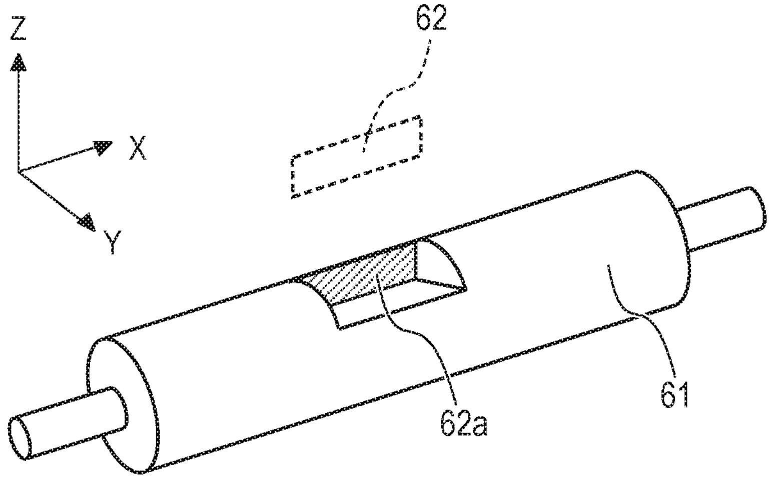
FIGS. 6A and 6B are explanatory views of cut pieces for measuring a domain shape according to the present disclosure.
Figure 6B:
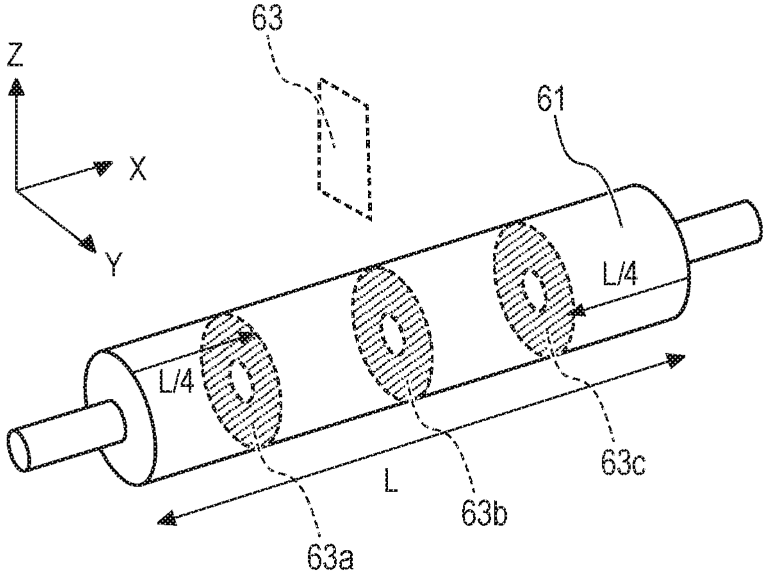

For example, as illustrated in FIG. 6A, when the longitudinal direction of the electrophotographic electro-conductive member is an X-axis, a thickness direction of the electro-conductive layer is a Z-axis, and a circumferential direction of the electro-conductive layer is a Y-axis, the thin piece is cut out from the electro-conductive layer so that the thin piece includes at least a part of a cross section 62*a* parallel to an XZ plane. In addition, as illustrated in FIG. 6B, the thin piece is cut so that at least a part of a YZ plane (for example, 63*a*, 63*b*, and 63*c*) perpendicular to an axial direction of the electrophotographic electro-conductive member. Examples of a unit for obtaining a thin piece may include a sharp razor blade, a microtome, and a focused ion beam (FIB) method.

For the measurement of the volume resistivity, one surface of the thin piece cut out from the electro-conductive layer is grounded. Next, a fine decorated probe of a scanning probe microscope (SPM) or an atomic force microscope (AFM) is brought in contact with a portion of the matrix of a surface opposite to the grounded surface of the thin piece, a direct current (DC) voltage of 50 V is applied thereto for 5 seconds, and an electric resistance value is calculated by calculating an arithmetic mean value of values obtained by measuring a ground current value for 5 seconds, and dividing the applied voltage by the calculated value. Finally, the resistance value is converted into a volume resistivity by using a thickness of the thin piece. In this case, the resistance value and the thickness of the thin piece can be simultaneously measured by SPM or AFM.

A thin piece sample is cut out from each of regions obtained by dividing the electro-conductive layer into four in the circumferential direction and dividing the electro-conductive layer into five in the longitudinal direction, the measured value is obtained, and then an arithmetic mean value of the volume resistivities of a total of 20 samples is calculated, thereby obtaining a value of the volume resistivity of the matrix in the cylindrical charging member.

<First Rubber>

A first rubber is a component mixed in a rubber mixture for forming an electro-conductive layer at the largest mixing ratio, and a mechanical strength of the electro-conductive layer depends on the first rubber cross-linked product. Therefore, the first rubber exhibits a strength of the electro-conductive layer required for the electrophotographic electro-conductive member after the cross-linking, and rubber that can be phase-separated from second rubber to be described later and can form the matrix-domain structure is used as the first rubber.

Preferred examples of the first rubber may include the followings. The examples of the first rubber can include natural rubber (NR), isoprene rubber (IR), butadiene rubber (BR), styrene-butadiene rubber (SBR), butyl rubber (IIR), ethylene-propylene rubber (EPM), ethylene-propylene-diene terpolymer rubber (EPDM), chloroprene rubber (CR), acrylonitrile-butadiene rubber (NBR), hydrogenated NBR (H-NBR), and silicone rubber.

<Reinforcing Material>

In addition, as a reinforcing material, reinforcing carbon black can be contained to the matrix at a degree that does not affect the electro-conductivity of the matrix. Here, examples of the reinforcing carbon black to be used can include FEF, GPF, SRF, and MT carbon that have a low electro-conductivity.

In addition, a filler, a processing aid, a vulcanization aid, a vulcanization accelerator, a vulcanization accelerator aid, a vulcanization retardant, an antioxidant, a softener, a dispersant, a coloring agent, and the like that is generally used as a rubber compounding agent may be added to the first rubber constituting the matrix, if necessary.

<Domain>

The domain has electro-conductivity, and includes a second rubber cross-linked product and an electro-conductive particle. Here, the electro-conductivity refers to that the volume resistivity is less than $1.0\times10^{8}$ Ω·cm.

<Second Rubber>

As a specific example, a second rubber is preferably at least one selected from the group consisting of natural rubber (NR), isoprene rubber (IR), butadiene rubber (BR), acrylonitrile-butadiene rubber (NBR), styrene-butadiene rubber (SBR), butyl rubber (IIR), ethylene-propylene rubber (EPM), ethylene-propylene-diene rubber (EPDM), chloroprene rubber (CR), nitrile rubber (NBR), hydrogenated nitrile rubber (H-NBR), silicone rubber, and urethane rubber (U).

<Electro-conductive Particle>

Examples of a material of the electro-conductive particle included in the domain may include a carbon material such as electro-conductive carbon black or graphite; oxide such as titanium oxide or tin oxide; a metal such as Cu or Ag; and an electron conductive agent such as an electro-conductive particle having a surface coated with oxide or a metal. In addition, two types or more of these electro-conductive particles may be used in combination in an appropriate amount, if necessary.

In addition, it is preferable that the proportion in the requirement (B1) is at least 20% or more, and preferably 25% or more and 30% or less. Within the above range, the electro-conductive particle can be filled in the domain at a high density. Therefore, an outer shape of the domain can be made close to a spherical shape, and a small unevenness can be achieved as defined in the requirement (B2). Furthermore, a charge can be supplied in a sufficient amount even under a high-speed process.

Among the various electro-conductive particles, the electro-conductive particle containing electro-conductive carbon black as a main component is preferable because the electro-conductive particle has a high affinity with rubber and a distance between the electro-conductive particles is easily controlled. The type of electro-conductive carbon black included in the domain may be not particularly limited. Specific examples of the electro-conductive carbon black may include gas furnace black, oil furnace black, thermal black, lamp black, acetylene black, and Ketjen black. Among them, as described below, particularly, carbon black having a DBP absorption amount of 40 $cm^3$/100 g or more and 80 $cm^3$/100 g or less may be adequately used.

<Shape of Electro-Conductive Domain>

The present inventors found that, by making the electro-conductive domain further close to a cylindrical shape, an electric field concentration caused due to a convex shape of the electro-conductive domain may be minimized, thus an excessive charge migration can be suppressed and the photosensitive body can be uniformly charged at the time of applying a high voltage. As a result, fogging can be suppressed.

The shape of each of the domains is determined as follows. Here, a length of the electro-conductive layer in the longitudinal direction is defined as L and a thickness of the electro-conductive layer is defined as T. Cross sections of the electro-conductive layer in a thickness direction thereof are obtained at the three positions including a center position of the electro-conductive layer in the longitudinal direction, and at two positions corresponding to L/4 from the both ends of the electro-conductive layer to the center of the electro-conductive layer, respectively. Then, three observation areas each having a 15 μm square are put at arbitrary three positions in a thickness region of each of the cross sections. The thickness region corresponds to a region between a depth of 0.1 T and a depth of 0.9 T from the outer surface of the electro-conductive layer as illustrated in FIG. 6B. In this case, a shape observed in each of all nine observation areas is defined as a shape of the domain.

It is preferable that the shape of the domain is closer to a circle as described above. Specifically, it is required for 80% or more of domains in the region having a 15 μm square in the cross section of the electro-conductive layer in the thickness direction to satisfy the following requirements (B1) and (B2).

Requirement (B1): a proportion of a cross-sectional area of the electro-conductive particle included in a domain to be judged among the domains included in the observation areas to a cross-sectional area of the domain is 20% or more; and Requirement (B2): A/B is 1.00 or more and 1.10 or less, where A is a perimeter of the domain, and B is an envelope perimeter of the domain.

A minimum value of a ratio of the perimeter of the domain in the requirement (B2) to the envelope perimeter of the domain is 1.00. A state in which the ratio is 1.00 indicates that the domain has perfect circular shape or an ellipse shape. When the ratio exceeds 1.10, a large unevenness shape is present in the domain, that is, the electric field concentration is easily generated. When the requirement (B2) is satisfied, the electric field concentration is suppressed, and thus fogging can be suppressed.

Figure 4:
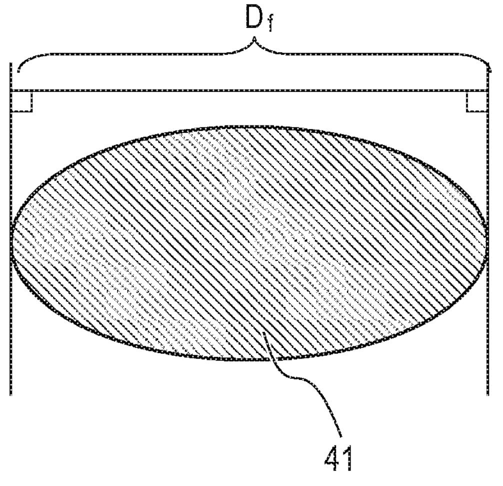
FIG. 4 is a schematic view illustrating a maximum Feret's diameter of a domain according to the present disclosure.

As illustrated in FIG. 4, a maximum Feret's diameter Df is a value when a perpendicular length is longest, the perpendicular length being obtained by interposing the outer circumference of an observed domain 41 between two parallel lines, and connecting the two parallel lines by a perpendicular line.

A size of the domain is preferably in a certain range. The maximum Feret's diameter, which is an index indicates the size of the domain is preferably 0.1 μm or more and 5.0 μm or less. When the maximum Feret's diameter is in the above range, the domain is likely to have a circular shape.

As a result, fogging is reduced. In addition, by reducing the size of the electro-conductive domain, the discharge is reduced, and thus it is possible to improve the quality of images.

<Measurement Methods of Maximum Feret's Diameter, Area, Perimeter, Envelope Perimeter of Domain, and Number of Domains>

Measurement methods of a maximum Feret's diameter, an area, a perimeter, and an envelope perimeter of the domain, and the number of domains may be performed as follows. First, a cut piece is prepared in the same manner as that of the method in the measurement of the volume resistivity of the matrix as described above. Next, a thin piece having a fracture surface can be formed by a method such as a freeze fracture method, a cross polisher method, or a focused ion beam (FIB) method. The FIB method is preferable in consideration of the smoothness of the fracture surface and the pretreatment for observation. In addition, in order to preferably carry out the observation of the matrix-domain structure, a pretreatment by which a preferred contrast between an electro-conductive phase and an insulating phase can be obtained, such as a dyeing treatment or a vapor deposition treatment, may be performed.

The thin piece subjected to the fracture surface formation and pretreatment can be observed with a scanning electron microscope (SEM) or a transmission electron microscope (TEM). Among them, it is preferable to perform the observation with the SEM at a magnification of 1,000 to 100,000 from the viewpoint of the precision of the quantification of the area of the domain.

The maximum Feret's diameter, the area, the perimeter, and the envelope perimeter of the domain, and the number of domains can be measured by quantifying the images captured above. That is, a 256 grayscale monochrome image of the fracture surface image obtained by the observation with the SEM is obtained by performing 8-bits grayscale using image processing software (product name: Image-ProPlus, manufactured by Media Cybernetics, Inc.). Next, a white and black image inversion processing is performed so that the domain in the fracture surface becomes white, and binarization is performed on the image. Subsequently, the maximum Feret's diameter, the area, the perimeter, the envelope perimeter of each domain in a domain group in the image, and the number of domains may be calculated.

When defining a length of the electro-conductive layer of the electrophotographic electro-conductive member in the longitudinal direction as L, samples for the above measurement are obtained from cut pieces at three portions located at the center of the electro-conductive layer in the longitudinal direction and at two portions corresponding to L/4 from the both ends of the electro-conductive layer to the center of the electro-conductive layer. A cut direction of the cut piece is a direction of the cross section perpendicular to the longitudinal direction of the electro-conductive layer.

The reason for evaluating the shape of the domain in the cross section perpendicular to the longitudinal direction of the electro-conductive layer as described above will be described with reference to FIGS. 6A and 6B.

FIGS. 6A and 6B illustrate a shape of an electrophotographic electro-conductive member 61 using three axes, specifically, a three dimension of X, Y, and Z axes. In FIGS. 6A and 6B, the X-axis indicates a direction parallel to the longitudinal direction (axial direction) of the electrophotographic electro-conductive member, and the Y and Z axes indicate directions perpendicular to the axial direction of the electrophotographic electro-conductive member.

FIG. 6A illustrates a domain view of the electrophotographic electro-conductive member in which the electrophotographic electro-conductive member is cut in the cross section 62*a* parallel to an XZ plane 62. The XZ plane can rotate 3600 about the axis of the electrophotographic electro-conductive member. In a consideration that the electrophotographic electro-conductive member rotates while being in contact with a photosensitive drum, and the electrophotographic electro-conductive member is discharged at the time of passing a gap between the electrophotographic electro-conductive member and the photosensitive drum, the cross section 62*a* parallel to the XZ plane 62 shows a surface where a discharge is simultaneously generated at a certain timing. Therefore, a surface potential of the photosensitive drum is formed by passing the surface corresponding to a certain portion of the cross section 62*a*. Since a large discharge on a surface of the photosensitive drum is locally increased by a locally large discharge due to the electric field concentration in the electrophotographic electro-conductive member, and thus fogging is generated, it is required to carry out an evaluation relating to the surface potential of the photosensitive drum that is formed by passing a set of the cross section 62*a* rather than a certain portion of a single cross section 62*a*. Therefore, it is required to carry out an evaluation in cross sections (63*a* to 63*c*) parallel to a YZ plane 63 perpendicular to the axial direction of the electrophotographic electro-conductive member, the evaluation capable of evaluating the shape of the domain including the certain portion of the cross section 62*a*, rather than analysis of a cross section at which a discharge is simultaneously generated at a certain moment, such as the cross section 62*a*.

When the length of the electro-conductive layer in the longitudinal direction is defined as L, the cross sections 63*a* to 63*c* are selected from three portions of the cross section 63*b* at the center of the electro-conductive layer in the longitudinal direction, and two cross sections (63*a* and 63*c*) corresponding to L/4 from the both ends of the electro-conductive layer to the center of the electro-conductive layer, respectively.

In addition, observation positions of the cross surfaces of the cut pieces of the cross sections 63*a* to 63*c* are as follows. That is, when defining the thickness of the electro-conductive layer as T, arbitrary three portions of the thickness region from the outer surface of each of the cut pieces to a depth of 0.1 T to 0.9 T from the outer surface of each of the cut pieces are specified. The measurement may be performed at nine positions in total when the observation areas each having a 15 μm square are put at the arbitrary three positions in each of the three cross sections.

<Control of Shape of Domain>

The shape of the domain close to a circular shape in the matrix-domain structure is an important point in terms of exerting the effect of the present disclosure. Since the electric field concentration and a deformation of the domain are suppressed by the formation of the domain close to a circular shape or the reduction of a size fluctuation of the maximum Feret's diameter, a resistance fluctuation is reduced.

The present inventors examined a method of making a shape of a cross section of the domain a circular shape, that is, the shape of the domain close to a spherical shape. As a result, it was determined that the shape of the domain can be achieved by using the following two methods.

A size of the domain (maximum Feret's diameter) is decreased.

The amount of carbon gel in the domain is increased.

The reason why the domain is made close to the spherical shape by decreasing the size of the domain (maximum Feret's diameter) is presumed as follows. In a case where the size of the domain is small even at the same volume fraction, a surface area of the domain is increased. As a result, an interface of the matrix and the domain is increased. Since the number of molecules surrounding the interface is larger than the number of molecules in the matrix, molecules in the vicinity of the interface have free energy larger than that of the molecules inside the domain. In order to reduce the free energy at the interface, it is considered that an interfacial tension acts to reduce the interface so as to make the domain close to a spherical shape (circular shape in the cross section of the electro-conductive layer in the thickness direction). As a result, the electric field concentration can be prevented.

Method of Decreasing Size of Domain (Maximum Feret's Diameter)

For a dispersion particle size (the size of the domain) D when two types of incompatible polymers are melt-kneaded, Taylor's equation represented by the following equations (4) to (7), Wu's empirical equation, and Tokita's equation are proposed (see Technical Journal 2003-II, 42 published by Sumitomo Chemical Co., Ltd.). Taylor's Equation $$D=[C\cdot\sigma/\eta m\cdot\gamma]\cdot f(\eta m/\eta d) \quad \text{Equation (4)}$$

Wu's Empirical Equation $$\gamma\cdot D\cdot\eta m/\sigma=4(\eta d/\eta m)^{0.84}\cdot\eta d/\eta m>1 \quad \text{Equation (5)}$$

$$\gamma\cdot D\cdot\eta m/\sigma=4(\eta d/\eta m)^{-0.84}\cdot\eta d/\eta m<1 \quad \text{Equation (6)}$$

Tokita's Equation $$D\cong\frac{12\times P\times\sigma\times\phi}{\pi\times\eta\times\gamma}\left(1+\frac{4\times P\times\phi\times EDK}{\pi\times\eta\times\gamma}\right) \quad \text{Equation (7)}$$

In Equations (4) to (7), D represents a size of a domain, C represents an integer, σ represents an interfacial tension, ηm represents a viscosity of a matrix, ηd represents a viscosity of the domain, γ represents a shear rate, η represents a viscosity of a mixture system, P represents a collision coalescence probability, φ represents a phase volume of the domain, and EDK represents a domain phase-cut energy.

As shown in the above equations, the shape of the domain can be formed close to a spherical shape by mainly controlling the following four points.

1. Interfacial Tension Difference between Domain and Matrix
2. Ratio of Viscosity of Domain to Viscosity of Matrix
3. Shear Rate at Time of Mixing/Energy Amount at Time of Searing
4. Volume Fraction of Domain 1. Interfacial Tension Difference Between Domain and Matrix In general, in a case where two types of polymers are mixed, phases thereof are separated. This phenomenon is generated because the same polymers aggregate and free energy is reduced for stabilization due to an interaction between the same polymers stronger than an interaction between different polymers. Since the different polymers are in contact with each other at the interface having a phase-separation structure, the free energy at the interface is higher than inside of the phase-separation structure in which the interaction between the same polymers is stabilized. As a result, the free energy at the interface is reduced, such that an interfacial tension that reduces an area in contact with the different polymers is generated. In a case where the interfacial tension is small, the different polymers tend to be uniformly mixed in order to increase entropy. A state in which the polymers are uniformly mixed indicates dissolution, an SP value to be a criterion of solubility and the interfacial tension tend to be correlated with each other. That is, since it is considered that an interfacial tension difference between the domain and the matrix is correlated with an SP value difference of the rubber material constituting the domain and the matrix, the tension difference can be controlled by selecting a raw rubber of the matrix and the domain, and the like. When a difference between absolute values of solubility parameters of the first rubber and the second rubber is 0.4 $(J/cm^3)^{0.5}$ or more and 4.0 $(J/cm^3)^{0.5}$ or less, the stable phase-separation structure can be formed. The difference is more preferably 0.4 $(J/cm^3)^{0.5}$ or more and 2.2 $(J/cm^3)^{0.5}$ or less. Within this range, the stable phase-separation structure can be formed, and the maximum Feret's diameter of the domain can also be decreased.

2. Ratio of Viscosity of Domain to Viscosity of Matrix

As a ratio (ηd/ηm) of a viscosity of the domain to a viscosity of the matrix is closer to 1, the maximum Feret's diameter of the domain can be decreased. The ratio of the viscosity of the domain to the viscosity of the matrix can be adjusted by selection of the Mooney viscosity of the raw rubber, or the type or the amount of filler to be added. In addition, it is also possible to add a plasticizer such as paraffin oil to an extent that does not inhibit the formation of the phase-separation structure. In addition, the viscosity ratio can be adjusted by adjusting a temperature at the time of kneading. It should be noted that the viscosity of each of the domain and the matrix can be obtained by measuring the Mooney viscosity ML (1+4) at a temperature of rubber at the time of kneading based on JIS K6300-1:2013. In addition, the viscosity may be replaced with a catalog value of the raw rubber.

3. Shear Rate at Time of Mixing/Energy Amount at Time of Searing

As a shear rate at the time of mixing/energy amount at the time of shearing is large, the maximum Feret's diameter of the domain can be decreased. The shear rate can be increased by increasing an inner diameter of a stirring member such as a blade or a screw of a kneading machine, reducing a gap from an end surface of the stirring member to an inner wall of the kneading machine, or increasing a rotation speed of the stirring member. In addition, the energy at the time of shearing can be increased by increasing the rotation speed of the stirring member or increasing the viscosity of the raw rubber for the domain and the viscosity of the raw rubber for the matrix.

4. Volume Fraction of Domain

A volume fraction of the domain in the electro-conductive layer is correlated with a collision coalescence probability between the domain and the matrix. Specifically, when the volume fraction in the electro-conductive layer is reduced, the collision coalescence probability between the domain and the matrix is reduced. That is, within the range in which a required electro-conductivity is obtained, the size of the domain can be decreased by reducing the volume fraction of the domain.

<Measurement Method of SP Value>

An SP value of rubber constituting the matrix and the domain can be accurately calculated by preparing a calibration curve by using a material of which an SP value is known. As the known SP value, a catalog value of a raw material manufacturer can be used. For example, NBR and SBR that can be used in the present disclosure do not depend on a molecular weight, and SP values of NBR and SBR are almost determined by a content ratio of acrylonitrile and styrene. Therefore, the content ratio of acrylonitrile and styrene in the rubber constituting the matrix and the domain is analyzed by pyrolysis gas chromatography (Py-GC) and a method of analyzing solid NMR. By doing so, the SP value can be calculated from the method of analyzing the calibration curve obtained from the material of which the SP value is known.

In addition, an SP value of isoprene rubber is determined in a 1,2-polyisoprene, 1,3-polyisoprene, 3,4-polyisoprene, cis-1,4-polyisoprene, or trans-1,4-polyisoprene isomeric structure. Therefore, similarly to SBR and NBR, the SP value can be calculated from the material of which the SP value is known by analyzing a content ratio of the isomer by Py-GC and solid NMR.

The SP value of the material of which the SP value is known is obtained by the Hansen sphere method.

Next, the reason why the domain is made close to a spherical shape by increasing the amount of carbon gel in the domain will be described. The carbon gel is a particulate material in a pseudo cross-linking state due to adsorption of rubber molecules on carbon black. The carbon gel does not dissolve even in an organic solvent that dissolves the raw rubber. That is, it is considered that three-dimensional cross-linking is formed by physical adsorption or chemical adsorption of the rubber molecules on a surface of carbon black, and the carbon gel acts as a rubber particle. As a result, it is presumed that the rubber particle formed in carbon gel becomes a core, and forms the domain. By increasing the amount of carbon gel, the unevenness shape of the domain can be suppressed, and the electric field concentration is suppressed, according to the requirement (B2).

In order to increase the amount of carbon gel, carbon black is preferably added in a large amount with respect to rubber, and the amount of carbon black that functions as an adsorbent may be increased.

As an index for adding a large amount of carbon black in the domain, attention was paid to a DBP adsorption amount. The DBP adsorption amount ($cm^3$/100 g) is a volume of dibutyl phthalate (DBP) at which 100 g of carbon black can adsorb rubber molecules, and is measured in accordance with JIS K 6217.

In general, carbon black has a tufted higher order structure in which primary particles having an average particle size of 10 nm or more and 50 nm or less are aggregated. The tufted higher order structure is called a structure, and a degree thereof is quantified by the DBP adsorption amount ($cm^3$/100 g).

In general, since carbon black having a developed structure has a high reinforcing property with respect to rubber, incorporation of carbon black into rubber deteriorates, and a shear torque at the time of kneading is very high, it is difficult to be highly filled.

As the electro-conductive carbon black to be used in the present disclosure, it is preferable to use carbon black having a DBP adsorption amount of 40 $cm^3$/100 g or more and 80 $cm^3$/100 g or less. When the DBP adsorption amount is in the above range, carbon black is added in a large amount with respect to rubber, such that the amount of carbon gel is increased.

In addition, when the DBP adsorption amount is in the above range, dispersibility of carbon black to rubber is good due to a small structure of the electro-conductive carbon black, such that carbon black is less aggregated, and an unevenness shape is small even in a carbon black unit. Therefore, it is easy to make the shape of the domain round. In a case where carbon black having a developed structure is used, a uniform dispersion with respect to rubber is difficult, and the carbon black is likely to be dispersed in an aggregate state. Originally, as described above, carbon black has an unevenness shape because it has a tufted higher order structure, and a lump having a large unevenness structure is easily formed by aggregating the carbon black. In a case where the aggregate of the carbon black is present in an outer edge of the domain, an unevenness structure may be formed by affecting the shape of the domain.

In addition, it is preferable that the electro-conductive carbon black included in the domain is added so that C which is an arithmetic mean of distances (also referred to as an "arithmetic mean wall-to-wall distance C") between adjacent carbons is 110 nm or more and 130 nm or less. When the arithmetic mean wall-to-wall distance C is 110 nm or more and 130 nm or less, the electron exchange between carbon black particles by a tunnel effect is possible between almost all carbon black in the domain. That is, it is because that, when the arithmetic mean wall-to-wall distance is satisfied, the volume resistivity of the domain becomes almost constant, and the electric field concentration is suppressed. In addition, it is because that a resistance fluctuation is suppressed by a change of a carbon black wall-to-wall distance due to repetition of an image output. Furthermore, the amount of carbon gel that exhibits a cross-linked rubber property in rubber in which carbon black is dispersed, such that the shape of the domain is easily maintained, and the domain at the time of molding is easily maintained in a circular shape. As a result, the electric field concentration or the change in domain-to-domain distance due to a deformation of the protrusions of the domain is suppressed, and a uniform discharge is easily achieved.

In addition, the arithmetic mean wall-to-wall distance C of the electro-conductive carbon black is 110 nm or more and 130 nm or less, and a standard deviation of distribution of the electro-conductive carbon black wall-to-wall distance is defined as σ·m. In this case, a coefficient of variation σ·m/C of the electro-conductive carbon black wall-to-wall distance is more preferably 0.0 or more and 0.3 or less. The coefficient of variation is a value indicating dispersion of the electro-conductive carbon black wall-to-wall distances. In a case where the electro-conductive carbon black wall-to-wall distances are all the same, the coefficient of variation is 0.0.

When the coefficient of variation σ·m/C is 0.0 or more and 0.3 or less, the electron exchange is possible by the tunnel effect between the carbon blacks in the domain due to a small dispersion of the carbon black wall-to-wall distances, and thus the volume resistivity is likely to be almost constant. In addition, since the carbon blacks are uniformly dispersed, uneven distribution of electro-conductive paths in the domain can be suppressed, and thus the electric field concentration in the domain can be suppressed. As a result, since the shape of the domain and the electric field concentration in the domain can be suppressed, a more uniform discharge is easily achieved.

The arithmetic mean value C of the electro-conductive carbon black wall-to-wall distances in the domain and a ratio of the cross section of the carbon black to the cross-sectional area of the domain may be measured as follows. First, the thin piece of the electro-conductive layer is prepared. In order to preferably carry out the observation of the matrix-domain structure, a pretreatment by which a preferred contrast between an electro-conductive phase and an insulating phase can be obtained, such as a dyeing treatment or a vapor deposition treatment, may be performed.

The thin piece subjected to the fracture surface formation and pretreatment can be observed with a scanning electron microscope (SEM) or a transmission electron microscope (TEM). Among them, it is preferable to perform the observation with the SEM at a magnification of 1,000 to 100,000 from the viewpoint of the precision of the quantification of the area of the domain, which is an electro-conductive phase. The arithmetic mean wall-to-wall distance and the ratio are obtained by binarizing and analyzing the obtained observation image with an image analyzer or the like.

<Method of Forming Protrusions of Domain>

The protrusions of the domain can be formed by grinding the surface of the electrophotographic electro-conductive member. In addition, the present inventors considered that, since the electro-conductive layer has a matrix-domain structure, the protrusions of the domain can be preferably formed by a grinding process using grindstone. The protrusions of the domain is preferably formed by a grinding method using polishing grindstone with a plunge-type polishing machine.

A presumed mechanism by which the protrusions of the domain can be formed by polishing grindstone will be described. First, the domains are filled with the electro-conductive particles such as carbon black and are dispersed in the matrix, and thus this matrix has a reinforcing property higher than a matrix filled with no electro-conductive particles. That is, in a case where the grinding process is performed with the same grindstone, since the domain has a high reinforcing property, it is difficult to grind the domain than the matrix, and the protrusions is easily formed. The protrusions of the domain can be formed by using the difference of the grinding properties caused by the difference of the reinforcing properties. In particular, the electrophotographic electro-conductive member according to the present embodiment is configured by filling the domain with many electro-conductive particles, and thus it is possible to preferably form the protrusions.

Here, the polishing grindstone for a plunge-type polishing machine used in polishing will be described. A surface roughness of the polishing grindstone can be adequately selected depending on a polishing efficiency or the type of constituent material for the electro-conductive layer. The surface roughness of the grindstone can be adjusted by the type, a grain size, a bonding degree, a bonding agent, and a structure (abrasive grain ratio) of abrasive grains.

It should be noted that the "grain size of abrasive grains" indicates a size of the abrasive grain, and is denoted by, for example, #80. The number in this case means that how many meshes are per 1 inch (25.4 mm) of a net for selecting the abrasive grain, and it indicates that as the number is large, the abrasive grain is fine. The "bonding degree of abrasive grains" indicates a hardness, and represented by alphabets A to Z. It represents that as the bonding degree is close to A, the abrasive grain is soft, and as the bonding degree is close to Z, the abrasive grain is hard. As a large amount of bonding agent is contained in the abrasive grain, the grindstone has a high bonding degree. The "structure (abrasive grain ratio) of abrasive grains" indicates a volume ratio of the abrasive grains occupied in the total volume ratio of the grindstone, and a density of the structure is represented by a magnitude of the structure. As the number indicating the structure is large, the abrasive grain is coarse. The grindstone having a large number of the structure and large pores is called a porous grindstone, and has advantages such as prevention of clogging and burning of the grindstone.

In general, the polishing grindstone can be manufactured by mixing raw materials (abrasive material, bonding agent, pore forming agent, and the like), and performing press-molding, drying, firing, and finishing. As a material of the abrasive grain, green silicon carbide (GC), black silicon carbide (C), white alumina (WA), brown alumina (A), zirconia alumina (Z), and the like can be used. These materials can be used alone or as a mixture of two or more thereof. In addition, vitrified (V), resinoid (B), resinoid reinforcement (BF), rubber (R), silicate (S), magnesia (Mg), shellac (E), and the like can be adequately used as the bonding agent depending on the application.

Here, it is preferable that a shape of an outer diameter of the grindstone in a longitudinal direction is formed in an inverted crown shape of which an outer diameter is gradually decreased toward the center portion from an end portion so that the electro-conductive roller can be polished into a crown shape. The shape of the outer diameter of the grindstone is preferably a shape of an arc curve or a secondary or higher-order curve with respect to the longitudinal direction. In addition, alternatively, the shape of the outer diameter of the grindstone may be a shape represented by various numerical expressions such as a biquadratic curve or a sine function. It is preferable that an outer shape of the grindstone is smoothly changed, but may be a shape obtained by making an arc curve close to a polygonal shape by a straight line. It is preferable that a width in a direction corresponding to an axial direction of the grindstone is equal to or more than a width of an axial direction of the electro-conductive roller.

In consideration of the above-described factors, the grindstone is adequately selected, and the grinding process is performed under a condition in which a difference of grinding properties between the domain and the matrix is promoted, whereby protrusions of the domain can be formed.

Specifically, a condition in which polishing is suppressed, and a condition in which an abrasive grain has a low sharpness are preferable. For example, the protrusions of the domain can be preferably formed by a method in which the time for a precision polishing process after roughing is shortened, and polishing is performed by using processed grindstone.

An example of the processed grindstone may include grindstone processed with a rubber member. A specific example of the processed grindstone may include grindstone subjected to a treatment such as abrasion of abrasive grains by polishing a surface of grindstone dressed with a rubber member in which the abrasive grains are included.

<Method of Measuring Protrusions of Domain>

A thin piece having a surface is taken out from the electro-conductive layer, and a convex shape of the domain can be confirmed and measured with a fine probe. A surface profile and an electric resistance profile of the thin piece sampled from the electrophotographic electro-conductive member are measured with an SPM. By doing so, it can be confirmed that the protrusions is the protrusions of the domain. Simultaneously, it is possible to quantify and evaluate a height of the protrusions from the shape profile. A specific procedure will be described later.

<Method of Measuring Domain-to-Domain Distance Dm on Outer Surface of Electrophotographic Electro-Conductive Member>

When defining a length of the electro-conductive layer in the longitudinal direction as L, and a thickness of the electro-conductive layer as T, samples cut out from three portions located at the center of the electro-conductive layer in the longitudinal direction and at two portions corresponding to L/4 from the both ends of the electro-conductive layer to the center of the electro-conductive layer, respectively, using a razor blade so that the sample includes the outer surface of the charging member. A size of the sample was 2 mm in a circumferential direction and a longitudinal direction of the charging member, and a thickness of the sample was a thickness T of the electro-conductive layer. In each of the obtained three samples, analysis regions each having a 50 μm square are set at arbitrary three portions of a surface corresponding to the outer surface of the charging member, and images of the three analysis regions are captured with a scanning electron microscope (product name: S-4800, manufactured by Hitachi High-Technologies Corporation) at a magnification of 5,000. The obtained nine captured images in total are binarized using image processing software (product name: LUZEX, manufactured by NIRECO CORPORATION).

The binarization procedure is performed as follows. A 256 grayscale monochrome image of the captured images is obtained by performing 8-bits grayscale. Then, binarization is performed and a binarized image of the captured image is obtained so that the domain in the captured image becomes black. Next, for each of the nine binarized images, a domain wall-to-wall distance is calculated, and an arithmetic mean value thereof is calculated. The value is defined as Dm. It should be noted that the wall-to-wall distance is a distance between the walls of the closest domains, and can be obtained by setting a measurement parameter as a distance between adjacent walls using the image processing software.

<Method of Preparing Electrophotographic Electro-conductive Member>

An example of a method of preparing an electrophotographic electro-conductive member according to the present disclosure will be described below. In this example, the preparation method includes the following steps (A) to (C), but the present disclosure is not particularly limited as long as it is in a range in which the configuration of the present disclosure can be achieved.

Step (A): a step of preparing carbon masterbatch (hereinafter, also referred to as "CMB") for domain formation, the carbon masterbatch containing carbon black and rubber;

Step (B): a step of preparing a rubber composition (hereinafter, also referred to as "MRC") for matrix formation;

Step (C): a step of preparing a rubber composition having a matrix-domain structure by kneading the CMB and the MRC; and Step (D): a step of forming an electro-conductive layer on an electro-conductive support by using the rubber composition prepared in the steps (A) to (C) by a known method such as an extrusion molding, an injection molding, or a compression molding.

It should be noted that the electro-conductive layer may be adhered on the electro-conductive support by an adhesive, if necessary. The electro-conductive layer formed on the electro-conductive support can be subjected to a vulcanization treatment, and a surface treatment with ultraviolet rays after a polishing treatment, if necessary.

<Process Cartridge>

Figure 7:
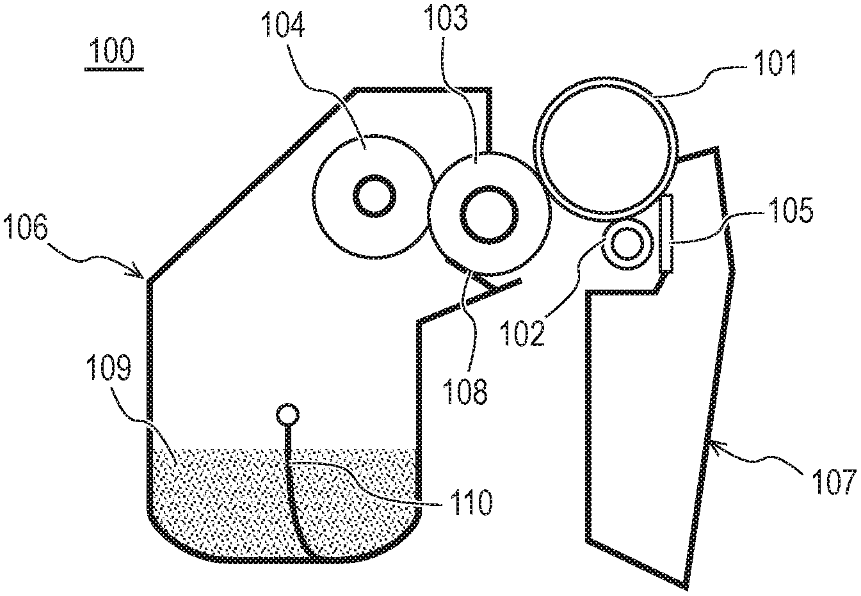
FIG. 7 is a cross-sectional view of a process cartridge according to an embodiment of the present disclosure.

FIG. 7 is a schematic cross-sectional view of an electrophotographic process cartridge 100 including an electrophotographic electro-conductive member according to an embodiment of the present disclosure as a charging member (charging roller). The process cartridge is integrated with a developing apparatus and a charging apparatus, and is detachably attachable to a main body of an electrophotographic apparatus. The developing apparatus is an apparatus integrated with at least a developing roller 103, a toner container 106, and a toner 109, and may include a toner supply roller 104, a developing blade 108, and a stirring impeller 110, if necessary. The charging apparatus is an apparatus integrated with at least a photosensitive drum 101 and a charging roller 102, and may include a cleaning blade 105 and a waste toner container 107. The charging roller 102, the developing roller 103, the toner supply roller 104, and the developing blade 108 each are configured to be applied with a voltage.

<Electrophotographic Image Forming Apparatus>

Figure 8:
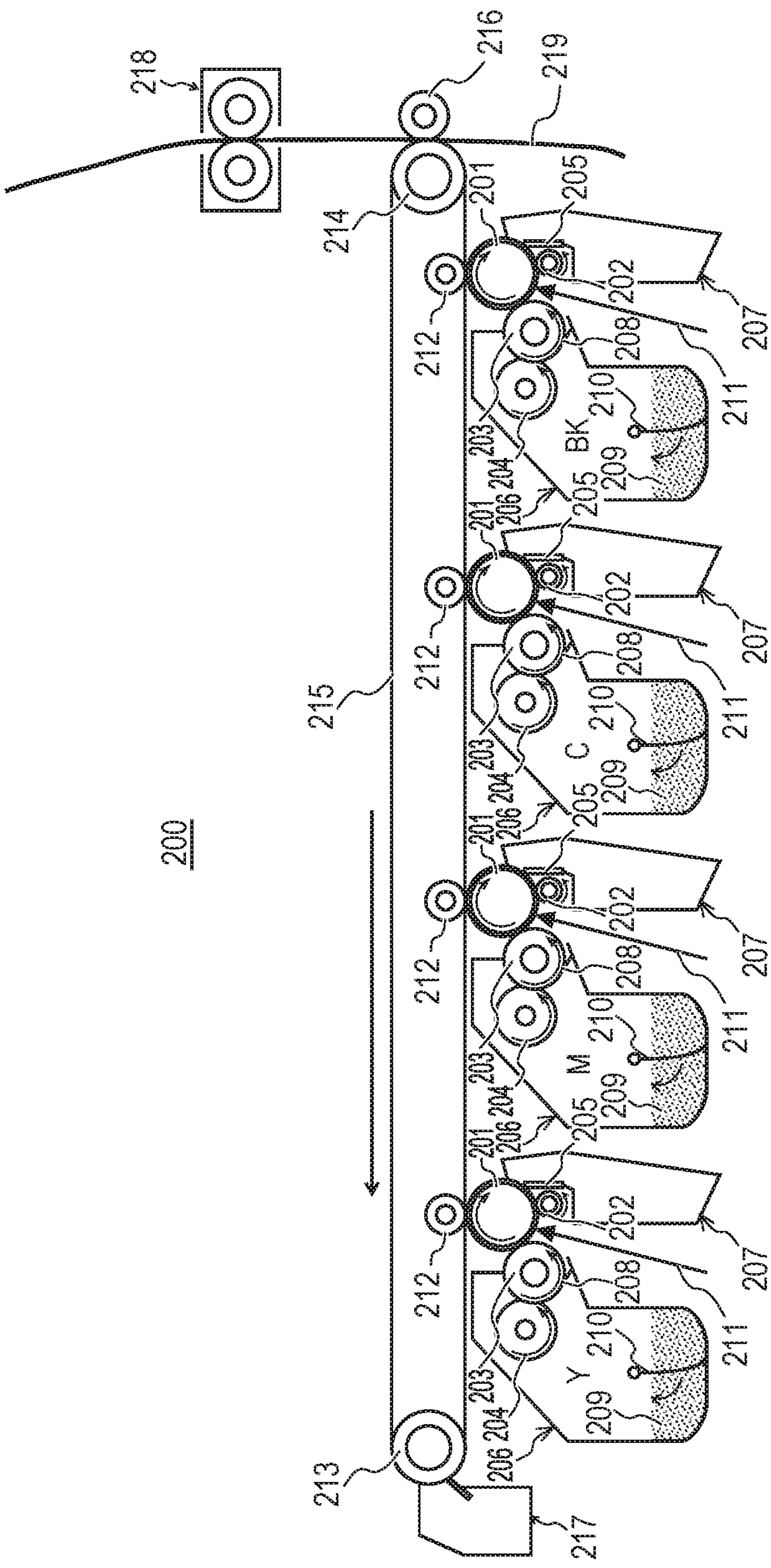
FIG. 8 is a cross-sectional view of an electrophotographic image forming apparatus according to an embodiment of the present disclosure.

FIG. 8 is a schematic cross-sectional view of an electrophotographic image forming apparatus 200 including an electrophotographic electro-conductive member according to an embodiment of the present disclosure as a charging member (charging roller). The apparatus is a color electrophotographic apparatus in which four process cartridges 100 are detachably attachable provided. The process cartridges respectively use toners of colors of black, magenta, yellow, and cyan. A photosensitive drum 201 is rotated in an arrow direction to be uniformly charged by a charging roller 202 to which a voltage is applied by a charging bias power source, and an electrostatic latent image is formed on the surface of the photosensitive drum by exposing light 211. On the other hand, a toner 209 contained in a toner container 206 is supplied to a toner supply roller 204 by a stirring impeller 210 to be conveyed onto a developing roller 203. In addition, the toner 209 is uniformly coated on the surface of the developing roller 203 by a developing blade 208 disposed in contact with the developing roller 203, and a charge is applied to the toner 209 by frictional charging. The electrostatic latent image is provided with the toner 209 conveyed by the developing roller 203 disposed in contact with the photosensitive drum 201 to be developed, so as to be visualized as a toner image.

The toner image visualized on the photosensitive drum is transferred by a primary transfer roller 212 to which a voltage is applied by a primary transfer bias power source, onto an intermediate transfer belt 215 supported and driven by a tension roller 213 and an intermediate transfer belt driving roller 214. The toner images of the respective colors are successively superimposed, and thus a color image is formed on the intermediate transfer belt.

A transfer material 219 is fed into the apparatus by a paper feed roller and conveyed to a portion between the intermediate transfer belt 215 and a secondary transfer roller 216. To the secondary transfer roller 216, a voltage is applied by a secondary transfer bias power source, so as to transfer the color image formed on the intermediate transfer belt 215 onto the transfer material 219. The transfer material 219 onto which the color image is transferred is subjected to a fixing process by a fixing unit 218, the resultant is ejected to the outside of the apparatus, and thus a printing operation is completed.

On the other hand, the toner not transferred but remaining on the photosensitive drum is scraped off by a cleaning blade 205 to be contained in a waste toner container 207, and the cleaned photosensitive drum 201 is repeatedly used for the above-described process. Further, the toner not transferred but remaining on the primary transfer belt is also scraped off by a cleaning apparatus 217.

Although the color electrophotographic apparatus is used as an example, only a black toner product is used as the process cartridge in a monochrome electrophotographic apparatus (not illustrated). A monochrome image is directly formed on the transfer material by the process cartridge and the primary transfer roller (without secondary transfer roller) without using the intermediate transfer belt. Thereafter, the transfer material is fixed by the fixing unit, the resultant is ejected to the outside of the apparatus, and thus a printing operation is completed.

According to an aspect of the present disclosure, it is possible to obtain the electrophotographic electro-conductive member that can be used as a charging member capable of suppressing fogging even when the charging bias is increased. Further, according to another aspect of the present disclosure, it is possible to obtain the process cartridge that contributes to stably forming a high quality electrophotographic image.

Further, according to still another aspect of the present disclosure, it is possible to obtain the electrophotographic image forming apparatus that can form a high quality electrophotographic image.

EXAMPLES

Subsequently, the electrophotographic electro-conductive member was prepared by using the following materials in the following Examples and Comparative Examples of the present disclosure.

<NBR>

NBR (1) (product name: JSR NBRN230SV, acrylonitrile content: 35%, Mooney viscosity ML (1+4) 100° C.: 32, SP value: 20.0 $(J/cm^3)^{0.5}$, manufactured by JSR Corporation, abbreviation: N230SV)

NBR (2) (product name: JSR NBR N215SL, acrylonitrile content: 48%, Mooney viscosity ML (1+4) 100° C.: 45, SP value: 21.7 $(J/cm^3)^{0.5}$, manufactured by JSR Corporation, abbreviation: N215SL)

NBR (3) (product name: Nipol DN401LL, acrylonitrile content: 18.0%, Mooney viscosity ML (1+4) 100° C.: 32, SP value: 17.4 $(J/cm^3)^{0.5}$, manufactured by ZEON Corporation, abbreviation: DN401LL)

<Isoprene Rubber IR>

Isoprene rubber (product name: Nipol IR2200L, Mooney viscosity ML (1+4) 100° C.: 70, SP value: 16.5 $(J/cm^3)^{0.5}$, manufactured by ZEON Corporation, abbreviation: IR2200L)

<Butadiene Rubber BR>

Butadiene rubber (1) (product name: UBEPOL BR130B, Mooney viscosity ML (1+4) 100° C.: 29, SP value: 16.8 $(J/cm^3)^{0.5}$, manufactured by UBE INDUSTRIES, LTD., abbreviation: BR130B)

Butadiene rubber (2) (product name: UBEPOL BR150B, Mooney viscosity ML (1+4) 100° C.: 40, SP value: 16.8 $(J/cm^3)^{0.5}$, manufactured by UBE INDUSTRIES, LTD., abbreviation: BR150B)

<SBR>

SBR (1) (product name: Asaprene 303, styrene content: 46%, Mooney viscosity ML (1+4) 100° C.: 45, SP value: 17.4 $(J/cm^3)^{0.5}$, manufactured by Asahi Kasei Corporation, abbreviation: A303)

SBR (2) (product name: Tufdene 2003, styrene content: 25%, Mooney viscosity ML (1+4) 100° C.: 33, SP value: 17.0 $(J/cm^3)^{0.5}$, manufactured by Asahi Kasei Corporation, abbreviation: T2003)

SBR (3) (product name: Tufdene 2100R, styrene content: 25%, Mooney viscosity ML (1+4) 100° C.: 78, SP value: 17.0 $(J/cm^3)^{0.5}$, manufactured by Asahi Kasei Corporation, abbreviation: T2100R)

SBR (4) (product name: Tufdene 2000R, styrene content: 25%, Mooney viscosity ML (1+4) 100° C.: 45, SP value: 17.0 $(J/cm^3)^{0.5}$, manufactured by Asahi Kasei Corporation, abbreviation: T2000R)

SBR (5) (product name: Tufdene 1000, styrene content: 18%, Mooney viscosity ML (1+4) 100° C.: 45, SP value: 16.8 $(J/cm^3)^{0.5}$, manufactured by Asahi Kasei Corporation, abbreviation: T1000)

<Chloroprene Rubber (CR)>

Chloroprene rubber (product name: SKYPRENE B31, Mooney viscosity ML (1+4) 100° C.: 40, SP value: 17.4 $(J/cm^3)^{0.5}$, manufactured by Tosoh Corporation, abbreviation: B31)

<EPDM>

EPDM (product name: Esprene505A, Mooney viscosity ML (1+4) 100° C.: 47, SP value: 16.0 $(J/cm^3)^{0.5}$, manufactured by Sumitomo Chemical Co., Ltd., abbreviation: E505A)

<Electro-Conductive Particle>

Carbon black (1) (product name: TOKABLACK #5500, DBP adsorption amount: 155 $cm^3$/100 g, manufactured by Tokai Carbon Co., Ltd., abbreviation: #5500)

Carbon black (2) (product name: TOKABLACK #7360SB, DBP adsorption amount: 87 $cm^3$/100 g, manufactured by Tokai Carbon Co., Ltd., abbreviation: #7360)

Carbon black (3) (product name: TOKABLACK #7270SB, DBP adsorption amount: 62 $cm^3$/100 g, manufactured by Tokai Carbon Co., Ltd., abbreviation: #7270)

Carbon black (4) (product name: #44, DBP adsorption amount: 78 $cm^3$/100 g, manufactured by Mitsubishi Chemical Corporation, abbreviation: #44)

Carbon black (5) (product name: Asahi #35, DBP adsorption amount: 50 $cm^3$/100 g, manufactured by Asahi Carbon Co., Ltd., abbreviation: #35)

Carbon black (6) (product name: #45L, DBP adsorption amount: 45 $cm^3$/100 g, manufactured by Mitsubishi Chemical Corporation, abbreviation: #45L) Tin-based oxide (product name: S-2000, manufactured by Mitsubishi Materials Electronic Chemicals Co., Ltd., abbreviation: tin oxide)

<Vulcanizing Agent>

Vulcanizing agent (1) (product name: SULFAX PMC, sulfur content: 97.5%, manufactured by Tsurumi Chemical Industry Co., Ltd., abbreviation: sulfur)

<Vulcanization Accelerator>

Vulcanization accelerator (1) (product name: Sanceler TBZTD, tetrabenzylthiuram disulfide, manufactured by SANSHIN CHEMICAL INDUSTRY CO., LTD., abbreviation: TBZTD)

Vulcanization accelerator (2) (product name: Nocceler TBT, tetrabutylthiuram disulfide, manufactured by OUCHI SHINKO CHEMICAL INDUSTRIAL CO., LTD., abbreviation: TBT)

Vulcanization accelerator (3) (product name: Nocceler EP-60, vulcanization accelerator mixture, manufactured by OUCHI SHINKO CHEMICAL INDUSTRIAL CO., LTD., abbreviation: EP-60)

Vulcanization accelerator (4) (product name: SANTOCURE-TBSI, N-t-butyl-2-benzothiazolesulfenamide, manufactured by FlexSys Inc., abbreviation: TBSI)

<Filler>

Filler (1) (product name: Nanox #30, calcium carbonate, manufactured by Maruo Calcium Co., Ltd., abbreviation: #30)

Filler (2) (product name: Nipsil AQ, silica, manufactured by Tosoh Corporation, abbreviation: AQ)

Hereinafter, the electrophotographic electro-conductive member, the process cartridge, and the electrophotographic image forming apparatus of the present disclosure will be described in detail, but the technical scope of the present disclosure is not limited thereto. First, a method of preparing an electrophotographic electro-conductive member in Examples and Comparative Examples of the present disclosure will be described in detail.

Example 1

[1.1 Preparation of Carbon Masterbatch (CMB) for Domain Formation]

The materials of the types and amounts as shown in Table 1 were mixed with a 6 L pressurized kneader (product name: TD6-15MDX, manufactured by Toshin Co., Ltd.), thereby obtaining CMB for domain formation. The mixing was performed under mixing conditions of a filling rate of 70 vol %, a blade rotation speed of 30 rpm, and the time of 16 minutes.

TABLE 1

| Material of CMB for domain formation | | |
|---|---|---|
| | Material name | Amount (Parts by mass) |
| Second rubber | NBR (product name: JSR NBR N230SV, manufactured by JSR Corporation) | 100 |
| Electro-conductive particle | Carbon black (product name: TOKABLACK #7270SB, manufactured by Tokai Carbon Co., Ltd.) | 70 |
| Vulcanization accelerator aid | Zinc oxide (product name: zinc oxide #2, manufactured by SAKAI CHEMICAL INDUSTRY CO., LTD.) | 5 |
| Processing aid | Zinc stearate (product name: SZ-2000, manufactured by SAKAI CHEMICAL INDUSTRY CO., LTD.) | 2 |

[1-2. Preparation of Rubber Composition for Matrix Formation]

The materials of the types and amounts as shown in Table 2 were mixed with a 6 L pressurized kneader (product name: TD6-15MDX, manufactured by Toshin Co., Ltd.), thereby obtaining a rubber composition for matrix formation. The mixing was performed under mixing conditions of a filling rate of 70 vol %, a blade rotation speed of 30 rpm, and the time of 18 minutes.

TABLE 2

| Material of rubber composition for matrix formation | | |
|---|---|---|
| | Material name | Amount (Parts by mass) |
| First rubber | SBR (product name: Tufdene 2003, manufactured by Asahi Kasei Corporation) | 100 |
| Filler | Calcium carbonate (product name: Nanox #30, manufactured by Maruo Calcium Co., Ltd.) | 40 |
| Vulcanization accelerator aid | Zinc oxide (product name: zinc oxide #2, manufactured by SAKAI CHEMICAL INDUSTRY CO., LTD.) | 5 |
| Processing aid | Zinc stearate (product name: SZ-2000, manufactured by SAKAI CHEMICAL INDUSTRY CO., LTD.) | 2 |

The materials of the types and amounts as shown in Table 3 were mixed with an open roll, thereby preparing a rubber composition for electro-conductive resin layer formation. An open roll having a roll diameter of 12 inches was used as a mixer. Mixing conditions were as follows: bilateral cutting was performed a total of 20 times at a rotation speed of a front roll of 10 rpm, a rotation speed of a back roll of 8 rpm, and a roll gap of 2 mm, and then tight milling was performed 10 times at a roll gap of 1.0 mm.

TABLE 3

| Rubber composition for electro-conductive resin layer formation | | |
|---|---|---|
| | Material name | Amount (Parts by mass) |
| Domain material | CMB for domain formation of Table 1 | 25 |
| Matrix material | Rubber composition for matrix formation of Table 2 | 75 |

TABLE 3-continued

| Rubber composition for electro-conductive resin layer formation | | |
|---|---|---|
| | Material name | Amount (Parts by mass) |
| Vulcanizing agent | Sulfur (product name: SULFAX PMC, sulfur content:97.5%, manufactured by Tsurumi Chemical Industry Co., Ltd.) | 3 |
| Vulcanization accelerator 1 | Tetrabenzylthiuram disulfide (product name: Sanceler TBZTD, manufactured by SAN SHIN CHEMICAL INDUSTRY CO., LTD.) | 1 |
| Vulcanization accelerator 2 | N-t-butyl-2-benzothiazolesulfenamide (product name: SANTOCURE-TBSI, manufactured by FlexSys Inc.) | 0.5 |

<2. Formation of Electrophotographic Electro-Conductive Member>

A round bar having a surface formed of free-cutting steel and having a total length of 252 mm and an outer diameter of 6 mm was prepared, the surface of the round bar being subjected to electroless nickel plating. Next, a roller coater was used for applying a bonding agent (product name: Metaloc U-20, manufactured by Toyokagaku Kenkyusho Co., Ltd.) over the entire circumference with a length of 230 mm of the round bar excluding both end portions each having a length of 11 mm. In the present Example, the round bar coated with the bonding agent was used as an electro-conductive support.

Next, a die having an inner diameter of 10.0 mm was attached to a tip of a cross head extruder equipped with a mechanism for supplying the electro-conductive support and a mechanism for discharging an unvulcanized rubber roller, the temperatures of the extruder and the cross head were set to 100° C., and a conveyance speed of the electro-conductive support was adjusted to 60 mm/sec. Under these conditions, the rubber composition for electro-conductive resin layer formation was supplied from the extruder to cover the circumferential portion of the electro-conductive support with the rubber composition for electro-conductive resin layer formation in the cross head, and thus an unvulcanized rubber roller was obtained.

Next, the unvulcanized rubber roller was put into a hot-air vulcanizing furnace at 170° C. to vulcanize an unvulcanized rubber composition by heating for 60 minutes, and thus an electro-conductive roller having an electro-conductive resin layer formed on the circumferential portion of the electro-conductive support was obtained. Thereafter, each of end portions of the electro-conductive resin layer was removed by cutting off by 10 mm to make a length of the electro-conductive resin layer in the longitudinal direction 232 mm.

[2-1. Polishing of Electro-Conductive Layer]

Next, the surface of the electro-conductive layer was polished under the polishing conditions described in the following polishing condition 1, and thus an electrophotographic electro-conductive member 1 having a crown shape was obtained, the electrophotographic electro-conductive member having a central portion having a diameter of 8.5 mm, and having both end portions each having a diameter of 8.44 mm at positions of 90 mm from the central portion to the both end portions.

(Polishing Condition 1)

As grindstone, grindstone (TEIKEN CORPORATION) having a cylindrical shape having a diameter of 305 mm and a length of 235 mm was prepared. The type, a grain size, a bonding degree, and a bonding agent of abrasive grains, and an abrasive grain material of structure (abrasive grain ratio) are as follows.

Abrasive grain material: green silicon carbide (GC), (JIS R6111-2002)

Grain size of abrasive grain: #80 (average particle size: 177 m, JIS B4130)

Bonding degree of abrasive grain: HH (JIS R6210)

Bonding agent: vitrified (V4PO)

Structure of abrasive grain (abrasive grain ratio): 23 (abrasive grain content: 16%, JIS R6242)

Polishing conditions are as follows: a rotation speed of the grindstone is 2,100 rpm, a rotation speed of the electrophotographic electro-conductive member is 250 rpm, and the grindstone intrudes into the electrophotographic electro-conductive member at 0.24 mm while being in contact with the outer surface of the electrophotographic electro-conductive member at an intruding speed of 20 mm/sec as a roughing process.

For a precision polishing process, the intruding speed is changed to 0.5 mm/sec, 0.01 mm of intrusion is performed, and the grindstone is separated from the electrophotographic electro-conductive member to finish the polishing.

As a polishing method, an upper cut method in which rotating directions of the grindstone and the electrophotographic electro-conductive member are the same as each other is adopted.

Electrophotographic electro-conductive members 2 to 45 were prepared in the same manner as that of the electrophotographic electro-conductive member 1, except that a starting material was changed to starting materials shown in Tables 4-1, 4-2, and 4-3, and the polishing condition was changed to polishing conditions described below. Parts by mass and physical properties of the starting materials that were used in the preparation of each of the electrophotographic electro-conductive members are shown in Tables 4-1, 4-2, and 4-3.

The detailed polishing conditions 2 to 5 are described below.

(Polishing Condition 2)

A polishing condition 2 was the same as in the polishing condition 1 except that the intruding speed was changed to 2.0 mm/sec in the precision polishing process.

(Polishing Condition 3)

A polishing condition 3 was the same as in the polishing condition 1 except that the intruding speed was changed to 1.0 mm/sec in the precision polishing process.

(Polishing Condition 4)

A polishing condition 4 was the same as in the polishing condition 1 except that the intruding speed was changed to 0.2 mm/sec in the precision polishing process.

(Polishing Condition 5)

A polishing condition 5 was the same as in the polishing condition 1 except that the intruding speed was changed to 0.1 mm/sec in the precision polishing process, 0.01 mm of intrusion was performed, and then the polishing was continued for 4 seconds.

The obtained results are shown in Tables 5-1 and 5-2.

TABLE 4-1

| Electrophotographic electro-conductive member | CMB for domain formation: Second rubber: Rubber type | Second rubber: Abbreviation | Second rubber: Mooney viscosity | Second rubber: SP value | Second rubber: Number of parts | Electro-conductive particle: Abbreviation | Electro-conductive particle: DBP adsorption amount | Electro-conductive particle: Number of parts | Zinc oxide: Number of parts | Zinc stearate: Number of parts |
|---|---|---|---|---|---|---|---|---|---|---|
| 1 | NBR | N2305V | 32 | 20.0 | 100 | #7270 | 62 | 70 | 5 | 2 |
| 2 | | N2305V | 32 | 20.0 | 100 | #7270 | 62 | 70 | 5 | 2 |
| 3 | | N2305V | 32 | 20.0 | 100 | #7270 | 62 | 70 | 5 | 2 |
| 4 | | N2305V | 32 | 20.0 | 100 | #7270 | 62 | 70 | 5 | 2 |
| 5 | | N2305V | 32 | 20.0 | 100 | #7270 | 62 | 70 | 5 | 2 |
| 6 | | DN401LL | 32 | 17.4 | 100 | #7270 | 62 | 70 | 5 | 2 |
| 7 | | N2305V | 32 | 20.0 | 100 | #7270 | 62 | 90 | 5 | 2 |
| 8 | | N2305V | 32 | 20.0 | 100 | #7270 | 62 | 60 | 5 | 2 |
| 9 | BR | BR130B | 29 | 16.8 | 100 | #7270 | 62 | 70 | 5 | 2 |
| 10 | | BR130B | 29 | 16.8 | 100 | #7270 | 62 | 70 | 5 | 2 |
| 11 | | BR130B | 29 | 16.8 | 100 | #7270 | 62 | 70 | 5 | 2 |
| 12 | IR | IR2200L | 70 | 16.5 | 100 | #7270 | 62 | 70 | 5 | 2 |
| 13 | | IR2200L | 70 | 16.5 | 100 | #7270 | 62 | 70 | 5 | 2 |
| 14 | | IR2200L | 70 | 16.5 | 100 | #7270 | 62 | 70 | 5 | 2 |
| 15 | EPDM | E505A | 47 | 16.0 | 100 | #7270 | 62 | 70 | 5 | 2 |
| 16 | SBR | T2003 | 33 | 17.0 | 100 | #7270 | 62 | 70 | 5 | 2 |
| 17 | BR | BR150B | 40 | 16.8 | 100 | #7270 | 62 | 70 | 5 | 2 |
| 18 | IR | IR2200L | 70 | 16.5 | 100 | #7270 | 62 | 70 | 5 | 2 |
| 19 | NBR | DN401LL | 32 | 17.4 | 100 | #7270 | 62 | 70 | 5 | 2 |
| 20 | EPDM | E505A | 47 | 16.0 | 100 | #7270 | 62 | 70 | 5 | 2 |
| 21 | | E505A | 47 | 16.0 | 100 | #7270 | 62 | 70 | 5 | 2 |
| 22 | SBR | T2003 | 33 | 17.0 | 100 | #7270 | 62 | 70 | 5 | 2 |
| 23 | | A303 | 45 | 17.4 | 100 | #7270 | 62 | 70 | 5 | 2 |
| 24 | BR | BR130B | 29 | 16.8 | 100 | #7270 | 62 | 70 | 5 | 2 |
| 25 | IR | IR2200L | 70 | 16.5 | 100 | #7270 | 62 | 70 | 5 | 2 |
| 26 | CR | B31 | 40 | 17.4 | 100 | #7270 | 62 | 70 | 5 | 2 |
| 27 | NBR | DN401LL | 32 | 17.4 | 100 | #7270 | 62 | 70 | 5 | 2 |
| 28 | EPDM | E505A | 47 | 16.0 | 100 | #7270 | 62 | 70 | 5 | 2 |
| 29 | IR | IR2200L | 70 | 16.5 | 100 | #7270 | 62 | 70 | 5 | 2 |
| 30 | SBR | T2003 | 33 | 17.0 | 100 | #7270 | 62 | 70 | 5 | 2 |
| 31 | NBR | N230SV | 32 | 20.0 | 100 | #7270 | 62 | 70 | 5 | 2 |
| 32 | EPDM | E505A | 47 | 16.0 | 100 | #7270 | 62 | 70 | 5 | 2 |
| 33 | BR | BR150B | 40 | 16.8 | 100 | #7270 | 62 | 70 | 5 | 2 |
| 34 | SBR | T2003 | 33 | 17.0 | 100 | #7270 | 62 | 70 | 5 | 2 |
| 35 | | T2003 | 33 | 17.0 | 100 | #7270 | 62 | 70 | 5 | 2 |
| 36 | NBR | DN401LL | 32 | 17.4 | 100 | #45L | 45 | 100 | 5 | 2 |
| 37 | | DN401LL | 32 | 17.4 | 100 | Asahi #35 | 50 | 80 | 5 | 2 |
| 38 | | DN401LL | 32 | 17.4 | 100 | #4 | 78 | 70 | 5 | 2 |
| 39 | | DN401LL | 32 | 17.4 | 100 | #7360 | 87 | 60 | 5 | 2 |
| 40 | | DN401LL | 32 | 17.4 | 100 | #5500 | 155 | 45 | 5 | 2 |
| 41 | | DN401LL | 32 | 17.4 | 100 | #7270 | 62 | 70 | 5 | 2 |
| 42 | | DN401LL | 32 | 17.4 | 100 | #7270 | 62 | 70 | 5 | 2 |
| 43 | BR | BR150B | 40 | 16.8 | 100 | #7270 | 62 | 70 | 5 | 2 |
| 44 | | BR150B | 40 | 16.8 | 100 | #7270 | 62 | 70 | 5 | 2 |
| 45 | IR | IR2200L | 70 | 16.5 | 100 | Tin oxide | — | 70 | 5 | 2 |
| 46 | NBR | N230SV | 32 | 20.0 | 100 | #7270 | 62 | 70 | 5 | 2 |

TABLE 4-2

| Electrophotographic electro-conductive member | Rubber composition for matrix formation: First rubber: Rubber type | First rubber: Abbreviation | First rubber: Mooney viscosity | First rubber: SP value | First rubber: Number of parts | Filler: Abbreviation | Filler: Number of parts | Zinc oxide: Number of parts | Zinc stearate: Number of parts |
|---|---|---|---|---|---|---|---|---|---|
| 1 | SBR | T2003 | 33 | 17.0 | 100 | #30 | 40 | 5 | 2 |
| 2 | | T2003 | 33 | 17.0 | 100 | #30 | 40 | 5 | 2 |
| 3 | | T2003 | 33 | 17.0 | 100 | #30 | 40 | 5 | 2 |
| 4 | | T2003 | 33 | 17.0 | 100 | #30 | 40 | 5 | 2 |
| 5 | | T2003 | 33 | 17.0 | 100 | #30 | 40 | 5 | 2 |
| 6 | | T2003 | 33 | 17.0 | 100 | #30 | 40 | 5 | 2 |
| 7 | | T2003 | 33 | 17.0 | 100 | #30 | 40 | 5 | 2 |
| 8 | | T2003 | 33 | 17.0 | 100 | #30 | 40 | 5 | 2 |
| 9 | | T2003 | 33 | 17.0 | 100 | #30 | 40 | 5 | 2 |

TABLE 4-2-continued

| Electrophotographic electro-conductive member | Rubber composition for matrix formation | | | | | | | | |
|---|---|---|---|---|---|---|---|---|---|
| | First rubber | | | | | Filler | | Zinc oxide | Zinc stearate |
| | Rubber type | Abbreviation | Mooney viscosity | SP value | Number of parts | Abbreviation | Number of parts | Number of parts | Number of parts |
| 10 | | T2000R | 45 | 17.0 | 100 | #30 | 40 | 5 | 2 |
| 11 | | T2100R | 78 | 17.0 | 100 | #30 | 40 | 5 | 2 |
| 12 | | T1000 | 45 | 16.8 | 100 | #30 | 40 | 5 | 2 |
| 13 | | T2000R | 45 | 17.0 | 100 | #30 | 40 | 5 | 2 |
| 14 | | A303 | 45 | 17.4 | 100 | #30 | 40 | 5 | 2 |
| 15 | | T2003 | 33 | 17.0 | 100 | #30 | 40 | 5 | 2 |
| 16 | EPDM | E505A | 47 | 16.0 | 100 | #30 | 40 | 5 | 2 |
| 17 | | E505A | 47 | 16.0 | 100 | #30 | 40 | 5 | 2 |
| 18 | | E505A | 47 | 16.0 | 100 | #30 | 40 | 5 | 2 |
| 19 | | E505A | 47 | 16.0 | 100 | #30 | 40 | 5 | 2 |
| 20 | NBR | DN401LL | 32 | 17.4 | 100 | #30 | 40 | 5 | 2 |
| 21 | | N215SL | 45 | 21.7 | 100 | AQ | 30 | 5 | 2 |
| 22 | | N230SV | 32 | 20.0 | 100 | #30 | 40 | 5 | 2 |
| 23 | | N230SV | 32 | 20.0 | 100 | #30 | 40 | 5 | 2 |
| 24 | | DN401LL | 32 | 17.4 | 100 | #30 | 40 | 5 | 2 |
| 25 | | DN401LL | 32 | 17.4 | 100 | #30 | 40 | 5 | 2 |
| 26 | | N230SV | 32 | 20.0 | 100 | #30 | 40 | 5 | 2 |
| 27 | BR | BR150B | 40 | 16.8 | 100 | #30 | 40 | 5 | 2 |
| 28 | | BR150B | 40 | 16.8 | 100 | #30 | 40 | 5 | 2 |
| 29 | | BR150B | 40 | 16.8 | 100 | #30 | 40 | 5 | 2 |
| 30 | | BR150B | 40 | 16.8 | 100 | #30 | 40 | 5 | 2 |
| 31 | IR | IR2200L | 70 | 16.5 | 100 | #30 | 40 | 5 | 2 |
| 32 | | IR2200L | 70 | 16.5 | 100 | #30 | 40 | 5 | 2 |
| 33 | | IR2200L | 70 | 16.5 | 100 | #30 | 40 | 5 | 2 |
| 34 | | IR2200L | 70 | 16.5 | 100 | #30 | 40 | 5 | 2 |
| 35 | CR | B31 | 40 | 17.4 | 100 | #30 | 40 | 5 | 2 |
| 36 | BR | BR150B | 40 | 16.8 | 100 | #30 | 40 | 5 | 2 |
| 37 | | BR150B | 40 | 16.8 | 100 | #30 | 40 | 5 | 2 |
| 38 | | BR150B | 40 | 16.8 | 100 | #30 | 40 | 5 | 2 |
| 39 | | BR150B | 40 | 16.8 | 100 | #30 | 40 | 5 | 2 |
| 40 | | BR150B | 40 | 16.8 | 100 | #30 | 40 | 5 | 2 |
| 41 | SBR | T2003 | 33 | 17.0 | 100 | #30 | 40 | 5 | 2 |
| 42 | | T2003 | 33 | 17.0 | 100 | AQ | 30 | 5 | 2 |
| 43 | IR | IR2200L | 70 | 16.5 | 100 | #30 | 40 | 5 | 2 |
| 44 | | IR2200L | 70 | 16.5 | 100 | #30 | 40 | 5 | 2 |
| 45 | EPDM | E505A | 47 | 16.0 | 100 | #30 | 40 | 5 | 2 |
| 46 | SBR | T2003 | 33 | 17.0 | 100 | #30 | 40 | 5 | 2 |

TABLE 4-3

| Electro-photographic electro-conductive member | Rubber composition for electro-conductive layer formation | | | | | | | | | |
|---|---|---|---|---|---|---|---|---|---|---|
| | CMB | MRC | Vulcanizing agent | | Vulcanization accelerator 1 | | Vulcanization accelerator 2 | | | |
| | Number ofparts | Number of parts | Item name | Number of parts | Abbreviation | Number of parts | Abbreviation | Number of parts | SP value difference | Polishing condition |
| 1 | 25.0 | 75.0 | Sulfur | 3 | TBzTD | 1 | TBSI | 0.5 | 3.0 | Polishing condition 1 |
| 2 | 25.0 | 75.0 | | 3 | TBzTD | 1 | TBSI | 0.5 | 3.0 | Polishing condition 2 |
| 3 | 25.0 | 75.0 | | 3 | TBzTD | 1 | TBSI | 0.5 | 3.0 | Polishing condition 3 |
| 4 | 25.0 | 75.0 | | 3 | TBzTD | 1 | TBSI | 0.5 | 3.0 | Polishing condition 4 |
| 5 | 25.0 | 75.0 | | 3 | TBzTD | 1 | TBSI | 0.5 | 3.0 | Polishing condition 5 |
| 6 | 27.5 | 72.5 | | 3 | TBzTD | 1 | TBSI | 0.5 | 0.4 | Polishing condition 1 |
| 7 | 25.0 | 75.0 | | 3 | TBzTD | 1 | TBSI | 0.5 | 3.0 | Polishing condition 1 |
| 8 | 30.0 | 70.0 | | 3 | TBzTD | 1 | TBSI | 0.5 | 3.0 | Polishing condition 1 |
| 9 | 27.5 | 72.5 | | 3 | TBzTD | 1 | TBSI | 0.5 | 0.2 | Polishing condition 1 |
| 10 | 27.5 | 72.5 | | 3 | TBzTD | 1 | TBSI | 0.5 | 0.2 | Polishing condition 1 |
| 11 | 27.5 | 72.5 | | 3 | TBzTD | 1 | TBSI | 0.5 | 0.2 | Polishing condition 1 |

TABLE 4-3-continued

| Electro-photographic electro-conductive member | Rubber composition for electro-conductive layer formation | | | | | | | | | |
|---|---|---|---|---|---|---|---|---|---|---|
| | CMB | MRC | Vulcanizing agent | | Vulcanization accelerator 1 | | Vulcanization accelerator 2 | | | |
| | Number ofparts | Number of parts | Item name | Number of parts | Abbreviation | Number of parts | Abbreviation | Number of parts | SP value difference | Polishing condition |
| 12 | 27.5 | 72.5 | | 3 | TBT | 1 | TBSI | 0.5 | 0.3 | Polishing condition 1 |
| 13 | 27.5 | 72.5 | | 3 | TBT | 1 | TBSI | 0.5 | 0.5 | Polishing condition 1 |
| 14 | 27.5 | 72.5 | | 3 | TBT | 1 | TBSI | 0.5 | 0.9 | Polishing condition 1 |
| 15 | 27.5 | 72.5 | | 3 | EP-60 | 4.5 | — | — | 1.0 | Polishing condition 1 |
| 16 | 30.0 | 70.0 | | 1.8 | EP-60 | 4.5 | — | — | 1.0 | Polishing condition 1 |
| 17 | 30.0 | 70.0 | | 1.8 | EP-60 | 4.5 | — | — | 0.8 | Polishing condition 1 |
| 18 | 30.0 | 70.0 | | 1.8 | EP-60 | 4.5 | — | — | 0.5 | Polishing condition 1 |
| 19 | 30.0 | 70.0 | | 1.8 | EP-60 | 4.5 | — | — | 1.4 | Polishing condition 1 |
| 20 | 25.0 | 75.0 | | 3 | EP-60 | 4.5 | — | — | 1.4 | Polishing condition 1 |
| 21 | 25.0 | 75.0 | | 3 | EP-60 | 4.5 | — | — | 5.7 | Polishing condition 1 |
| 22 | 25.0 | 75.0 | | 3 | TBzTD | 1 | TBSI | 0.5 | 3.0 | Polishing condition 1 |
| 23 | 25.0 | 75.0 | | 3 | TBzTD | 1 | TBSI | 0.5 | 2.6 | Polishing condition 1 |
| 24 | 25.0 | 75.0 | | 3 | TBzTD | 1 | TBSI | 0.5 | 0.6 | Polishing condition 1 |
| 25 | 25.0 | 75.0 | | 3 | TBT | 1 | TBSI | 0.5 | 0.9 | Polishing condition 1 |
| 26 | 25.0 | 75.0 | Sulfur/ZnO/Mg0 | 1/5/4 | Sanceler 22 | 1 | TRA | 0.7 | 2.6 | Polishing condition 1 |
| 27 | 27.5 | 72.5 | Sulfur | 3 | TBzTD | 1 | TBSI | 0.5 | 0.6 | Polishing condition 1 |
| 28 | 27.5 | 72.5 | | 3 | EP-60 | 4.5 | — | — | 0.8 | Polishing condition 1 |
| 29 | 27.5 | 72.5 | | 3 | TBT | 1 | TBSI | 0.5 | 0.3 | Polishing condition 1 |
| 30 | 27.5 | 72.5 | | 3 | TBzTD | 1 | TBSI | 0.5 | 0.2 | Polishing condition 1 |
| 31 | 27.5 | 72.5 | | 3 | TBT | 1 | TBSI | 0.5 | 3.5 | Polishing condition 1 |
| 32 | 27.5 | 72.5 | | 3 | EP-60 | 4.5 | — | — | 0.5 | Polishing condition 1 |
| 33 | 27.5 | 72.5 | | 3 | TBzTD | 1 | TBSI | 0.5 | 0.3 | Polishing condition 1 |
| 34 | 27.5 | 72.5 | | 3 | TBzTD | 1 | TBSI | 0.5 | 0.5 | Polishing condition 1 |
| 35 | 27.5 | 72.5 | Sulfur/ZnO/Mg0 | 1/5/4 | Sanceler 22 | 1 | TRA | 0.7 | 0.4 | Polishing condition 1 |
| 36 | 30.0 | 70.0 | Sulfur | 3 | TBzTD | 1 | TBSI | 0.5 | 0.6 | Polishing condition 1 |
| 37 | 27.5 | 72.5 | | 3 | TBzTD | 1 | TBSI | 0.5 | 0.6 | Polishing condition 1 |
| 38 | 25.0 | 75.0 | | 3 | TBzTD | 1 | TBSI | 0.5 | 0.6 | Polishing condition 1 |
| 39 | 25.0 | 75.0 | | 3 | TBzTD | 1 | TBSI | 0.5 | 0.6 | Polishing condition 1 |
| 40 | 22.5 | 77.5 | | 3 | TBzTD | 1 | TBSI | 0.5 | 0.6 | Polishing condition 1 |
| 41 | 27.5 | 72.5 | | 3 | TBzTD | 1 | TBSI | 0.5 | 0.4 | Polishing condition 1 |
| 42 | 27.5 | 72.5 | | 3 | TBzTD | 1 | TBSI | 0.5 | 0.4 | Polishing condition 1 |
| 43 | 25.0 | 75.0 | | 3 | TBzTD | 1 | TBSI | 0.5 | 0.3 | Polishing condition 1 |
| 44 | 35.0 | 65.0 | | 3 | TBzTD | 1 | TBSI | 0.5 | 0.3 | Polishing condition 1 |
| 45 | 30.0 | 70.0 | | 3 | EP-60 | 4.5 | — | — | 0.5 | Polishing condition 1 |
| 46 | 25 | 75.0 | Sulfur | 3 | TBzTD | 1 | TBSI | 0.5 | 3.0 | Polishing condition 1 |

<3. Evaluation of Characteristics>

Subsequently, hereinafter, an evaluation of characteristics of the following items in Examples and Comparative Examples of the present disclosure will be described.

<Confirmation of Matrix-Domain Structure>

The presence or absence of the formation of a matrix-domain structure in the electro-conductive layer is confirmed by the following method.

A cut piece (thickness of 500 μm) is cut out using a razor blade so that a cross section perpendicular to the longitudinal direction of the electro-conductive layer of the electrophotographic electro-conductive member can be observed. Next, platinum vapor deposition is performed, imaging is performed with a scanning electron microscope (SEM) (product name: S-4800, manufactured by Hitachi High-Technologies Corporation) at a magnification of 1,000, thereby obtaining a cross section image.

In addition, in order to quantify the obtained captured image, a 256 grayscale monochrome image of the fracture surface image obtained by the observation with the SEM is obtained by performing 8-bits grayscale using image processing software (product name: Image-ProPlus, manufactured by Media Cybernetics, Inc.). Next, a white and black image inversion processing is performed so that the domain in the fracture surface becomes white, and a binarization threshold is set based on the algorithm of Otsu's discrimination analysis method for a luminance distribution of the image, and then the binarized image is obtained.

By a counting function for the binarized image, as described above, a percent K of the number of domains that are not connected to each other and isolated with respect to the total number of domains that are present in the region having the 50 μm square and do not have a contact point with the frame of the binarized image is calculated.

Specifically, in the counting function of the image processing software, it is set so that domains having the contact point with the frame line at the end portions of the binarized image in four directions are not counted.

Cut pieces are prepared from 20 points in total, the 20 points being obtained from arbitrary one point of each of regions obtained by evenly dividing electro-conductive layer of the electrophotographic electro-conductive member into five in a longitudinal direction, and evenly dividing electro-conductive layer of the electrophotographic electro-conductive member into four in a circumferential direction, and then an arithmetic mean value of K (number %) when performing the measurement is calculated.

When the arithmetic mean value of K (number %) is 80 or more, the matrix-domain structure is evaluated as "presence", and when the arithmetic mean value of K (number %) is less than 80, the matrix-domain structure is evaluated as "absence".

<Measurement Method of Maximum Feret's Diameter, Perimeter, and Envelope Perimeter of Domain>

Measurement methods of a maximum Feret's diameter, a perimeter, and an envelope perimeter of a domain according to the present disclosure may be performed as follows.

First, a thin piece having a thickness of 1 μm is cut out from the electro-conductive layer of the electrophotographic electro-conductive member at a cutting temperature of −100° C. using a microtome (product name: Leica EM FCS, manufactured by Leica Microsystems).

When a length of the electro-conductive layer in the longitudinal direction is defined as L, and a thickness of the electro-conductive layer is defined as T, the positions cut out from the electro-conductive layer are set at three portions located at the center of the electro-conductive layer in the longitudinal direction and two portions corresponding to L/4 from the both ends of the electro-conductive layer to the center of the electro-conductive layer.

The cut pieces obtained by the above method were subjected to vapor deposition with platinum, and thus vapor-deposited cut piece was obtained. Next, an image of a surface of the vapor-deposited cut piece was captured with a scanning electron microscope (SEM) (product name: S-4800, manufactured by Hitachi High-Technologies Corporation) at a magnification of 5,000, thereby obtaining a surface image.

The maximum Feret's diameter, the perimeter, and the envelope perimeter of the domain according to the present disclosure can be obtained by quantifying the captured image. A 256 grayscale monochrome image of the obtained fracture surface image is obtained by performing 8-bits grayscale using image processing software (product name: Image-ProPlus, manufactured by Media Cybernetics, Inc.). Next, a white and black image inversion processing is performed so that the domain in the fracture surface becomes white, and binarization is performed on the image. Next, the maximum Feret's diameter, a perimeter A, and an envelope perimeter B of the domain in the image were calculated.

When a thickness of the electro-conductive layer is T, the measurement was performed on observation areas each having a 15 μm square at arbitrary three portions of each of three cut pieces of the thickness region from the outer surface of each of the cut pieces to a depth of 0.1 T to 0.9 T from the outer surface of each of the cut pieces, that is, at nine portions in total.

A value of A/B is calculated by using the perimeter and the envelope perimeter that are measured in each domain observed in each observation region. Among the total observation domains, the number of domains satisfying the requirement (B2) was obtained.

In addition, in the domain satisfying the requirements (B1) and (B2), an arithmetic mean value of A/B, which indicates the unevenness shape of the domain, i.e. and an arithmetic mean value of the maximum Feret's diameters were calculated. The evaluation results are shown in Table 5-2.

<Measurement Method of Volume Resistivity of Matrix>

A volume resistivity of a matrix is measured by operating a scanning probe microscope (SPM) (product name: Q-Scope250, manufactured by Quesant Instrument Corporation) in a contact mode.

First, a cut piece was cut out at the same position and with the same method as in the measurement method of the maximum Feret's diameter, the perimeter, and the envelope perimeter of the domain, and the number of domains. Next, under an environment of a temperature of 23° C. and a humidity of 50% RH, the cut piece was disposed on a metal plate, a portion directly in contact with the metal plate was selected, and a cantilever of the SPM was brought in contact with a portion corresponding to the matrix. Subsequently, a voltage of 50 V was applied to the cantilever and a current value was measured.

A surface shape of the measurement cut piece was observed with the SPM, and a thickness of the measurement portion was calculated from the obtained height profile. A volume resistivity was calculated from the thickness and the current value, and was defined as a volume resistivity of the matrix.

When a thickness of the electro-conductive layer is T, the measurement was performed at arbitrary three portions of the matrix portion of each of cut pieces of the thickness region from the outer surface of each of the cut pieces to a depth of 0.1 T to 0.9 T, that is, at nine portions in total. An average value thereof was defined as a volume resistivity of the matrix. The evaluation results are shown in Table 5-1.

<Measurement Method of DBP Adsorption Amount of Carbon Black>

A DBP adsorption amount of carbon black was measured in accordance with JIS K 6217. In addition, a manufacturer's catalog value may also be used.

<Measurement Methods of Arithmetic Mean Wall-to-Wall Distance C of Electro-Conductive Carbon Black in Domain, Standard Deviation σ·m, Coefficient of Variation σ·m/C, and Proportion of Cross-Sectional Area of Carbon Black of Domain to Area of Domain>

An arithmetic mean wall-to-wall distance C of the electro-conductive carbon black in a domain, a standard deviation σ·m, a coefficient of variation σ·m/C, and a proportion of a cross-sectional area of the carbon black included in the domain to an area of the domain may be measured as follows.

First, a cut piece is prepared in the same manner as that of the measurement methods of the maximum Feret's diameter, the area, the perimeter, and the envelope perimeter of the domain.

The cut piece obtained by the above method was subjected to vapor deposition with platinum, and thus vapor-deposited cut piece was obtained. Next, an image of a surface of the vapor-deposited cut piece was captured with a scanning electron microscope (SEM) (product name: S-4800, manufactured by Hitachi High-Technologies Corporation) at a magnification of 20,000, thereby obtaining a surface image.

The arithmetic mean wall-to-wall distance of the carbon black in the domain and the area of the carbon black can be obtained by quantifying the captured image. A 256 grayscale monochrome image of the fracture surface image obtained by the observation with the SEM is obtained by performing 8-bits grayscale using an image analyzer (product name: LUZEX-AP, manufactured by NIRECO CORPORATION). Next, a white and black image inversion processing is performed so that the domain in the fracture surface becomes white, and binarization is performed on the image.

Next, an observation region having a size into which at least one domain is fitted is extracted from the SEM image. Then, a wall-to-wall distance Ci of the carbon black in the domain is calculated. Then, the arithmetic mean wall-to-wall distance C is calculated by obtaining an arithmetic mean of wall-to-wall distances.

In addition, a cross-sectional area of the domain and a cross-sectional area of the carbon black in the domain are also calculated from the SEM image.

The cross-sectional area of the domain, and the arithmetic mean wall-to-wall distance and the cross-sectional area of the carbon black in the domain are obtained as follows. That is, when a thickness of the electro-conductive layer is T, the measurement may be performed at arbitrary three portions of the domain portion of each of three cut pieces of the thickness region from the outer surface of each of the cut pieces to a depth of 0.1 T to 0.9 T, that is, at nine portions in total, and the values may be calculated from the arithmetic mean of the measured values.

The standard deviation σ·m is obtained from the obtained wall-to-wall distance of the electro-conductive carbon black in the domain and the arithmetic mean C thereof. Then, the coefficient of variation σ·m/C is obtained by dividing the standard deviation c-m by the arithmetic mean C. Among the total observation domains, the number of domains satisfying the requirement (B1) was obtained.

In addition, in the domain satisfying the requirements (1) and (2), the arithmetic mean wall-to-wall distance C of the carbon black, the coefficient of variation σ·m/C, and a proportion of the cross-sectional area of the carbon black to the cross-sectional area of domain were calculated.

The results are shown in Table 5-2.

<SP Value of Rubber Constituting Matrix and Domain>

An SP value can be measured using a swelling method according to the related art. Rubbers each constituting the matrix and the domain are separated using a manipulator and the like, and the rubbers are immersed in solvents having different SP values, thereby measuring a degree of swelling from a mass change of the rubber. By analyzing the solvents by using a value of the degree of swelling, a Hansen solubility parameter (HSP) can be calculated. In addition, by preparing a calibration curve by using a material of which an SP value is known, the parameter can be accurately calculated. As the known SP value, a catalog value of a raw material manufacturer can be used. The evaluation results are shown in Table 5-1.

<Analysis of Chemical Composition of First Rubber and Second Rubber>

A specification of a material, a first rubber and a second rubber, a styrene content in SBR, and an acrylonitrile content in NBR can be analyzed using an analyzer such as an FT-IR or a 1H-NMR according to the related art. The evaluation results are shown in Table 5-1.

<Measurement Method of Impedance of Electrophotographic Electro-Conductive Member>

An impedance of the electrophotographic electro-conductive member was measured by the following measurement method.

First, as a pretreatment, the electrophotographic electro-conductive member was subjected to vacuum platinum vapor deposition while being rotated, thereby preparing a measuring electrode. At this time, a uniform electrode having a width of 1.5 cm in a circumferential direction was prepared using a masking tape. By forming the electrode, a contact area between the measuring electrode and the electrophotographic electro-conductive member can be significantly reduced due to the surface roughness of the electrophotographic electro-conductive member. Next, an aluminum sheet was wound around the electrode so that the aluminum sheet was in contact with a platinum vapor-deposited film, and thus a measurement sample illustrated in FIGS. 3A and 3B was formed.

Then, an impedance measuring apparatus (Solartron 126096W, manufactured by TOYO Corporation) was also connected to the measuring electrode from the aluminum sheet, or the electro-conductive support.

The impedance was measured at a vibration voltage of 1 Vpp and a frequency of 1.0 Hz under an environment of a temperature of 23° C. and a relative humidity of 50%, and an absolute value of the impedance was obtained.

The measurement was performed by dividing the electrophotographic electro-conductive member (a length in the longitudinal direction: 232 mm) into five regions, and forming the measuring electrodes at five points in total, the five points being obtained from arbitrary one point of each of the regions. An average value thereof was defined as an impedance of the electrophotographic electro-conductive member. The evaluation results are shown in Table 5-1.

<Measurement of Protrusions of Domain>

A thin piece having a thickness of 1 m is cut out from the electro-conductive layer of the electrophotographic electroconductive member at a cutting temperature of −100° C. using a microtome (product name: Leica EM FCS, manufactured by Leica Microsystems). At this time, the thin piece has a surface perpendicular to an axis of the electro-conductive support.

When a length of the electro-conductive layer in the longitudinal direction is defined as L, the positions cut out from the electro-conductive layer are set at three portions located at the center of the electro-conductive layer in the longitudinal direction and at two portions corresponding to L/4 from the both ends of the electro-conductive layer to the center of the electro-conductive layer, respectively.

In this case, in order to confirm that a protrusion on the outer surface of the electrophotographic electro-conductive member is derived from the domain, it should be noted that any processing is not performed on the outer surface of the electrophotographic electro-conductive member. Next, the surface of the electrophotographic electro-conductive member was measured by using the cut piece including the surface of the electrophotographic electro-conductive member obtained as described above with an SPM (MFP-3D-Origin, manufactured by Oxford Instruments) under the following conditions. An electric resistance value profile and a shape profile were measured by the measurement.

MFP-3D-Origin, manufactured by Oxford Instruments
Measurement mode: AM-FM mode
Probe: OMCL-AC160TS, manufactured by Olympus Corporation
Resonance frequency: 251.825 to 261.08 kHz
Spring constant: 23.59 to 25.18 N/m
Scan speed: 0.8 to 1.5 Hz
Scan size: 10 μm, 5 μm, 3 μm
Target amplitude: 3 V and 4 V
Set Point: all 2 V Next, it is confirmed that the protrusions in the surface shape profile obtained by the above measurement is protrusions of the domain having electro-conductivity higher than the periphery thereof in the electric resistance value profile.

In addition, a height of the convex shape is calculated from the profile. In the calculation method, the value is obtained by taking a difference between an arithmetic mean value of the shape profile of the domains and an arithmetic mean value of the shape profile of the adjacent matrices. It should be noted that the arithmetic mean value is calculated from the value obtained by measuring 20 protrusions randomly selected from the cut pieces cut out from the three portions.

The results are shown in Table 5-2.

<Measurement of Domain-to-Domain Distance Dm on Outer Surface of Electrophotographic Electro-conductive Member>

The domain-to-domain distance Dm on the outer surface of the electrophotographic electro-conductive member is measured as follows.

When the outer surface of the electrophotographic electro-conductive member is observed, and Dm is measured, a measurement sample is obtained by cutting the surface of the electrophotographic electro-conductive member to obtain a cut piece having a depth of about 500 μm by using a razor blade, the cut piece having a length of about 2 mm in the circumferential direction and the longitudinal direction of the electro-conductive layer of the electrophotographic electro-conductive member, and having the surface of the electrophotographic electro-conductive member in a depth direction. When a length of the electro-conductive layer in the longitudinal direction is defined as L, the positions cut out from the electro-conductive layer are set at three portions located at the center of the electro-conductive layer in the longitudinal direction and at two portions corresponding to L/4 from the both ends of the electro-conductive layer to the center of the electro-conductive layer, respectively.

The surface of the obtained cut piece, which corresponds to the outer surface of the electrophotographic electro-conductive member, is subjected to platinum vapor deposition, thereby obtaining a vapor-deposited cut piece. Next, an image of a surface of the vapor-deposited cut piece is captured with a scanning electron microscope (product name: S-4800, manufactured by Hitachi High-Technologies Corporation) at a magnification of 5,000, thereby obtaining an observation image. The obtained observation image is binarized using image processing software LUZEX (manufactured by NIRECO CORPORATION), thereby obtaining a binarized image.

The binarization procedure is performed as follows. A 256 grayscale monochrome image of the observation images is obtained by performing 8-bits grayscale. Then, a white and black image inversion processing is performed so that the domain in the fracture surface becomes white, and binarization is performed on the image. Next, a distribution of a wall-to-wall distance between the domains is calculated from the binarized image, and then an arithmetic mean value Dm of the distribution is calculated. The wall-to-wall distance is the shortest distance between adjacent domains.

Specifically, a measurement parameter is set as a distance between adjacent walls using the image processing software.

It should be noted that the arithmetic mean value of 10 points of the observation images randomly selected from the outer surface of the electrophotographic electro-conductive member is adopted.

The results are shown in Table 5-2.

<4. Evaluation of Image>

[4-1] Fogging Evaluation

The image was formed as follows by using the obtained electrophotographic electro-conductive member, and fogging was evaluated so as to confirm unevenness of charge of the electrophotographic electro-conductive member. As the electrophotographic image forming apparatus, LaserJet M608dn (product name, manufactured by HP Company) modified so that a high voltage can be applied to the charging member and the developing member from an external power source (product name: Model615, manufactured by TREK JAPAN) was prepared.

Next, the electrophotographic electro-conductive member, the modified electrophotographic image forming apparatus, and the process cartridge were allowed to stand under an environment of 30° C. and 80% RH for 48 hours. Then, the electrophotographic electro-conductive member was incorporated into the process cartridge as the charging member. Then, a direct voltage of −1,700 V was applied to the electro-conductive support of the electrophotographic electro-conductive member, the voltage was applied to the developing member so that Vback (voltage obtained by dividing a voltage applied to the developing member from a surface potential of the photosensitive body) becomes −350 V, and an entirely white image was output.

Since the developer of the electrophotographic image forming apparatus is negatively charged, in general, in a case where the entirely white image is output, originally, the developer does not migrate onto the photosensitive body and the paper. However, in a case where the developer positively charged is present in the developer, the developer positively charged migrates, so-called reverse fogging occurs on an overcharged portion of the surface of the photosensitive body due to a locally strong discharge from the charging member. As a result, fogging appears on the paper. This phenomenon is more likely to occur when Vback is large, such as −350 V. The entirely white image was output to measure the amount of fogging on the paper under an environment of 30° C./80% RH by the electrophotographic image forming apparatus set as described above. The amount of fogging was measured by the following method.

(Measurement of Amount of Fogging on Paper)

The entirely white image was printed, nine points randomly obtained from the paper on which the image was formed were observed with an optical microscope at a magnification of 500, the amount of developer present in the observation region having a 400 μm square was counted, and the number was defined as the amount of fogging on the paper. It should be noted that, when the amount of fogging on the paper is 60 or less, an image with a small fogging is obtained. More preferably, the amount of fogging on the paper is 50 or less. The evaluation results are shown in Tables 5-1 and 5-2.

Examples 2 to 5

Electrophotographic electro-conductive members 2 to 5 were prepared as in Example 1 and evaluations were carried out as in Example 1, except that the polishing condition of Example 1 was changed to polishing conditions 2 to 5. The results of the respective evaluations in Examples 2 to 5 are shown in Tables 5-1 and 5-2.

Examples 6 to 45

Electrophotographic electro-conductive members 6 to 45 were used as charging rollers in the same manner as that of the electrophotographic electro-conductive member 1 in Example 1, and evaluations were carried out as in Example 1. The results of the respective evaluations in Examples 6 to 45 are shown in Tables 5-1 and 5-2.

Example 46

An electrophotographic electro-conductive member 46 was prepared by performing a surface treatment of the electrophotographic electro-conductive member 1 of Example 1 with ultraviolet rays. Evaluations were carried out as in Example 1 except for this. The evaluation results are shown in Tables 5-1 and 5-2.

(Surface Treatment with Ultraviolet Rays)

The surface of the electrophotographic electro-conductive member was irradiated with ultraviolet rays for 5 minutes by a low pressure mercury lamp (manufactured by HARISON TOSHIBA LIGHTING Corporation) while rotating the electrophotographic electro-conductive member. The low pressure mercury lamp mainly emits ultraviolet rays having a wavelength of 254 nm. In this case, an accumulated amount of ultraviolet rays was 10,000 mJ/cm$^2$ (ultraviolet intensity of 35 mW/cm$^2$).

TABLE 5-1

| Electro-photographic electro-conductive member | Matrix rubber composition | | | Domain rubber composition | | | Domain proportion (mass %) | Matrix volume resistivity (Ω · cm) | Impedance (Ω) | SP value difference |
|---|---|---|---|---|---|---|---|---|---|---|
| | First rubber Rubber type | Filler Abbreviation | Filler Number of parts | Second rubber Rubber type | Carbon black DBP adsorption amount | Carbon black Number of parts | | | | |
| 1 | SBR | #30 | 40 | NBR | 62 | 70 | 25.0 | 8.30E+13 | 5.60E+06 | 3.0 |
| 2 | | #30 | 40 | | 62 | 70 | 25.0 | 8.30E+13 | 5.60E+06 | 3.0 |
| 3 | | #30 | 40 | | 62 | 70 | 25.0 | 8.30E+13 | 5.60E+06 | 3.0 |
| 4 | | #30 | 40 | | 62 | 70 | 25.0 | 8.30E+13 | 5.60E+06 | 3.0 |
| 5 | | #30 | 40 | | 62 | 70 | 25.0 | 8.30E+13 | 5.60E+06 | 3.0 |
| 6 | | #30 | 40 | | 62 | 70 | 27.5 | 1.10E+14 | 4.20E+05 | 0.4 |
| 7 | | #30 | 40 | | 62 | 90 | 25.0 | 7.90E+13 | 9.80E+04 | 3.0 |
| 8 | | #30 | 40 | | 62 | 60 | 30.0 | 8.50E+13 | 6.40E+04 | 3.0 |
| 9 | | #30 | 40 | BR | 62 | 70 | 27.5 | 8.90E+13 | 6.30E+06 | 0.2 |
| 10 | | #30 | 40 | | 62 | 70 | 27.5 | 9.00E+13 | 8.70E+06 | 0.2 |
| 11 | | #30 | 40 | | 62 | 70 | 27.5 | 9.10E+13 | 7.20E+05 | 0.2 |
| 12 | | #30 | 40 | IR | 62 | 70 | 27.5 | 5.60E+14 | 6.10E+06 | 0.3 |
| 13 | | #30 | 40 | | 62 | 70 | 27.5 | 9.00E+13 | 9.20E+05 | 0.5 |
| 14 | | #30 | 40 | | 62 | 70 | 27.5 | 8.50E+12 | 2.40E+05 | 0.9 |
| 15 | | #30 | 40 | EPDM | 62 | 70 | 27.5 | 1.50E+14 | 8.50E+05 | 1.0 |
| 16 | EPDM | #30 | 40 | SBR | 62 | 70 | 30.0 | 3.20E+16 | 7.10E+06 | 1.0 |
| 17 | | #30 | 40 | BR | 62 | 70 | 30.0 | 3.80E+16 | 6.40E+06 | 0.8 |
| 18 | | #30 | 40 | IR | 62 | 70 | 30.0 | 4.10E+16 | 4.70E+06 | 0.5 |
| 19 | | #30 | 40 | NBR | 62 | 70 | 30.0 | 2.10E+16 | 5.90E+06 | 1.4 |
| 20 | NBR | #30 | 40 | EPDM | 62 | 70 | 25.0 | 5.00E+08 | 4.30E+05 | 1.4 |
| 21 | | #30 | 40 | | 62 | 70 | 25.0 | 9.80E+07 | 9.40E+05 | 5.7 |
| 22 | | #30 | 40 | SBR | 62 | 70 | 25.0 | 2.90E+08 | 3.40E+05 | 3.0 |
| 23 | | #30 | 40 | | 62 | 70 | 25.0 | 2.50E+08 | 4.70E+05 | 2.6 |
| 24 | | #30 | 40 | BR | 62 | 70 | 25.0 | 4.80E+08 | 2.50E+05 | 0.6 |
| 25 | | #30 | 40 | IR | 62 | 70 | 25.0 | 4.90E+08 | 1.90E+05 | 0.9 |
| 26 | | #30 | 40 | CR | 62 | 70 | 25.0 | 2.80E+08 | 8.40E+04 | 2.6 |
| 27 | BR | #30 | 40 | NBR | 62 | 70 | 27.5 | 3.10E+15 | 5.30E+06 | 0.6 |
| 28 | | #30 | 40 | EPDM | 62 | 70 | 27.5 | 4.90E+15 | 6.40E+05 | 0.8 |
| 29 | | #30 | 40 | IR | 62 | 70 | 27.5 | 3.40E+15 | 7.00E+05 | 0.3 |
| 30 | | #30 | 40 | SBR | 62 | 70 | 27.5 | 3.20E+15 | 1.80E+06 | 0.2 |
| 31 | IR | #30 | 40 | NBR | 62 | 70 | 27.5 | 8.40E+15 | 3.20E+05 | 3.5 |
| 32 | | #30 | 40 | EPDM | 62 | 70 | 27.5 | 1.00E+16 | 2.70E+06 | 0.5 |
| 33 | | #30 | 40 | BR | 62 | 70 | 27.5 | 8.90E+15 | 6.50E+06 | 0.3 |
| 34 | | #30 | 40 | SBR | 62 | 70 | 27.5 | 8.70E+15 | 5.50E+05 | 0.5 |
| 35 | CR | #30 | 40 | | 62 | 70 | 27.5 | 5.20E+10 | 3.80E+05 | 0.4 |

TABLE 5-1-continued

| Electro-photographic electro-conductive member | Matrix rubber composition: First rubber Rubber type | Matrix rubber composition: Filler Abbreviation | Matrix rubber composition: Filler Number of parts | Domain rubber composition: Second rubber Rubber type | Domain rubber composition: Carbon black DBP adsorption amount | Domain rubber composition: Carbon black Number of parts | Domain proportion (mass %) | Matrix volume resistivity (Ω · cm) | Impedance (Ω) | SP value difference |
|---|---|---|---|---|---|---|---|---|---|---|
| 36 | BR | #30 | 40 | NBR | 45 | 100 | 30.0 | 3.30E+15 | 9.80E+07 | 0.6 |
| 37 | | #30 | 40 | | 50 | 80 | 27.5 | 3.10E+15 | 3.90E+07 | 0.6 |
| 38 | | #30 | 40 | | 78 | 70 | 27.5 | 3.10E+15 | 7.40E+04 | 0.6 |
| 39 | | #30 | 40 | | 87 | 60 | 25.0 | 3.10E+15 | 8.60E+04 | 0.6 |
| 40 | | #30 | 40 | | 155 | 45 | 22.5 | 3.20E+15 | 3.30E+03 | 0.6 |
| 41 | SBR | #30 | 40 | | 62 | 70 | 27.5 | 2.20E+14 | 4.90E+05 | 0.4 |
| 42 | | AQ | 30 | | 62 | 70 | 27.5 | 3.20E+14 | 2.10E+05 | 0.4 |
| 43 | IR | #30 | 40 | BR | 62 | 70 | 25.0 | 8.50E+15 | 6.60E+06 | 0.3 |
| 44 | | #30 | 40 | | 62 | 70 | 35.0 | 8.90E+15 | 4.90E+06 | 0.3 |
| 45 | EPDM | #30 | 40 | IR | Electro-conductive tin | 70 | 30.0 | 3.20E+16 | 8.90E+07 | 0.5 |
| 46 | SBR | #30 | 40 | NBR | 62 | 70 | 25.0 | 8.70E+13 | 5.80E+06 | 3.0 |

TABLE 5-2

| Electro-photographic electro-conductive member | Matrix-domain structure | Number % of domain satisfying requirement (B1) | Number % of domain satisfying requirement (B2) | Unevenness shape of domain A/B | Maximum Feret's diameter (μm) | CB average wall-to-wall distance (nm) | Coefficient of variation σ · m/C | Proportion of cross-sectional area of CB to cross-sectional area of domain | Domain-to-domain distance Dm (μm) | Height of protrusions of domain (nm) | Fogging on paper (number) |
|---|---|---|---|---|---|---|---|---|---|---|---|
| 1 | Presence | 87 | 89 | 1.02 | 2.5 | 111 | 0.2 | 28.0 | 0.85 | 110 | 29 |
| 2 | Presence | 87 | 89 | 1.02 | 2.5 | 111 | 0.2 | 28.0 | 0.85 | 291 | 59 |
| 3 | Presence | 87 | 89 | 1.02 | 2.5 | 111 | 0.2 | 28.0 | 0.84 | 198 | 48 |
| 4 | Presence | 87 | 89 | 1.02 | 2.5 | 111 | 0.2 | 28.0 | 0.85 | 50 | 49 |
| 5 | Presence | 87 | 89 | 1.02 | 2.5 | 111 | 0.2 | 28.0 | 0.85 | 11 | 59 |
| 6 | Presence | 92 | 89 | 1.02 | 0.9 | 111 | 0.2 | 28.0 | 0.36 | 84 | 20 |
| 7 | Presence | 90 | 88 | 1.05 | 1.9 | 109 | 0.2 | 28.2 | 0.77 | 107 | 26 |
| 8 | Presence | 84 | 92 | 1.03 | 4.0 | 113 | 0.2 | 27.8 | 1.31 | 155 | 35 |
| 9 | Presence | 89 | 89 | 1.03 | 1.2 | 110 | 0.2 | 26.3 | 0.40 | 91 | 29 |
| 10 | Presence | 92 | 90 | 1.02 | 0.7 | 110 | 0.2 | 26.2 | 0.31 | 80 | 20 |
| 11 | Presence | 94 | 89 | 1.02 | 0.6 | 110 | 0.2 | 26.3 | 0.26 | 77 | 21 |
| 12 | Presence | 88 | 88 | 1.03 | 1.5 | 110 | 0.2 | 26.5 | 0.57 | 98 | 29 |
| 13 | Presence | 90 | 89 | 1.03 | 1.2 | 110 | 0.2 | 26.4 | 0.48 | 91 | 24 |
| 14 | Presence | 91 | 89 | 1.03 | 0.9 | 110 | 0.2 | 26.5 | 0.37 | 84 | 22 |
| 15 | Presence | 89 | 88 | 1.04 | 2.1 | 110 | 0.2 | 26.0 | 0.75 | 111 | 28 |
| 16 | Presence | 88 | 91 | 1.03 | 2.3 | 110 | 0.2 | 26.8 | 0.81 | 116 | 25 |
| 17 | Presence | 89 | 90 | 1.03 | 2.2 | 110 | 0.2 | 26.3 | 0.83 | 114 | 23 |
| 18 | Presence | 89 | 88 | 1.04 | 1.2 | 110 | 0.2 | 26.5 | 0.38 | 91 | 27 |
| 19 | Presence | 88 | 89 | 1.03 | 2.0 | 110 | 0.2 | 27.2 | 0.71 | 109 | 28 |
| 20 | Presence | 89 | 88 | 1.04 | 1.8 | 110 | 0.2 | 26.0 | 0.79 | 105 | 36 |
| 21 | Presence | 80 | 88 | 1.04 | 6.2 | 110 | 0.2 | 25.9 | 2.50 | 204 | 52 |
| 22 | Presence | 90 | 91 | 1.03 | 1.8 | 110 | 0.2 | 26.7 | 0.80 | 105 | 30 |
| 23 | Presence | 89 | 91 | 1.03 | 1.5 | 110 | 0.2 | 27.2 | 0.62 | 98 | 32 |
| 24 | Presence | 90 | 90 | 1.03 | 0.9 | 110 | 0.2 | 26.3 | 0.40 | 84 | 32 |
| 25 | Presence | 85 | 88 | 1.04 | 3.0 | 110 | 0.2 | 26.4 | 1.21 | 132 | 44 |
| 26 | Presence | 87 | 88 | 1.04 | 2.7 | 110 | 0.2 | 32.6 | 1.18 | 125 | 41 |
| 27 | Presence | 90 | 89 | 1.03 | 1.2 | 110 | 0.2 | 27.1 | 0.45 | 91 | 24 |
| 28 | Presence | 89 | 88 | 1.04 | 1.2 | 110 | 0.2 | 26.1 | 0.45 | 91 | 27 |
| 29 | Presence | 90 | 88 | 1.03 | 1.1 | 110 | 0.2 | 26.5 | 0.43 | 89 | 27 |
| 30 | Presence | 92 | 90 | 1.03 | 0.6 | 110 | 0.2 | 26.8 | 0.30 | 77 | 30 |
| 31 | Presence | 82 | 89 | 1.04 | 5.1 | 110 | 0.2 | 27.3 | 1.87 | 179 | 38 |
| 32 | Presence | 90 | 88 | 1.04 | 1.6 | 110 | 0.2 | 26.0 | 0.60 | 100 | 26 |
| 33 | Presence | 89 | 90 | 1.02 | 1.0 | 110 | 0.2 | 26.2 | 0.35 | 87 | 25 |
| 34 | Presence | 88 | 91 | 1.02 | 2.2 | 110 | 0.2 | 26.8 | 0.90 | 114 | 25 |
| 35 | Presence | 88 | 90 | 1.02 | 2.1 | 110 | 0.2 | 26.7 | 0.70 | 111 | 38 |
| 36 | Presence | 91 | 93 | 1.02 | 0.9 | 108 | 0.1 | 28.4 | 0.30 | 84 | 20 |
| 37 | Presence | 89 | 92 | 1.02 | 1.2 | 109 | 0.2 | 28.2 | 0.48 | 91 | 25 |
| 38 | Presence | 85 | 85 | 1.06 | 1.6 | 110 | 0.2 | 25.6 | 0.63 | 100 | 34 |
| 39 | Presence | 83 | 83 | 1.07 | 1.8 | 115 | 0.2 | 24.9 | 0.82 | 105 | 51 |
| 40 | Presence | 82 | 80 | 1.10 | 2.0 | 135 | 0.4 | 24.5 | 0.85 | 109 | 53 |
| 41 | Presence | 92 | 88 | 1.03 | 0.7 | 116 | 0.2 | 21.2 | 0.28 | 80 | 22 |

TABLE 5-2-continued

| Electro-photographic electro-conductive member | Matrix-domain structure | Number % of domain satisfying requirement (B1) | Number % of domain satisfying requirement (B2) | Unevenness shape of domain A/B | Maximum Feret's diameter (μm) | CB average wall-to-wall distance (nm) | Coefficient of variation σ · m/C | Proportion of cross-sectional area of CB to cross-sectional area of domain | Domain-to-domain distance Dm (μm) | Height of protrusions of domain (nm) | Fogging on paper (number) |
|---|---|---|---|---|---|---|---|---|---|---|---|
| 42 | Presence | 94 | 89 | 1.02 | 0.6 | 110 | 0.2 | 27.3 | 0.24 | 77 | 33 |
| 43 | Presence | 93 | 90 | 1.02 | 0.7 | 110 | 0.2 | 27.2 | 0.34 | 80 | 32 |
| 44 | Presence | 90 | 90 | 1.02 | 1.5 | 110 | 0.2 | 26.3 | 0.95 | 98 | 22 |
| 45 | Presence | 82 | 81 | 1.07 | 2.5 | — | — | — | 0.87 | 189 | 58 |
| 46 | Presence | 87 | 89 | 1.02 | 2.5 | 111 | 0.2 | 28.0 | 0.85 | 110 | 25 |

Comparative Example 1

An electro-conductive roller was prepared by preparing an electro-conductive layer as in Example 1 and forming a surface layer on the electro-conductive layer as below, except that the same round bar as in Example 1 was used as the electro-conductive support, the carbon masterbatch (CMB) for domain formation, the rubber composition (MRC) for matrix formation, and the rubber composition for electro-conductive layer formation were changed as shown in Table 6, and the MRC for matrix formation was not used.

TABLE 6

| Electrophotographic electro-conductive member | | | Comparative Example 1 C1 | Comparative Example 2 C2 | Comparative Example 3 C3 | Comparative Example 4 C4 | Comparative Example 5 C5 |
|---|---|---|---|---|---|---|---|
| CMB for domain formation | Second rubber | Rubber type | ECO | NBR | EPDM | NBR | SBR |
| | | Abbreviation | CG102 | N230SV | E505A | N230SV | T2003 |
| | | Mooney viscosity | 56 | 32 | 47 | 32 | 32 |
| | | SP value | 18.5 | 20 | 16 | 20 | 17 |
| | | Number of parts | 100 | 100 | 100 | 100 | 100 |
| | Electro-conductive agent | Abbreviation | LV | #7360 | #7359 | #7360 | — |
| | | DBP | — | 87 | 360 | 87 | — |
| | | Number of parts | 3 | 50 | 45 | 60 | — |
| | Zinc oxide | Number of parts | 5 | 5 | — | 5 | 5 |
| | Zinc stearate | Number of parts | 1 | 1 | 1 | 1 | 1 |
| | Additive | Abbreviation | MB | — | — | — | — |
| | | Number of parts | 1 | — | — | — | — |
| | Filler | Abbreviation | #30 | #30 | — | — | — |
| | | Number of parts | 60 | 40 | — | — | — |
| | Plasticizer | Abbreviation | P202 | — | PW380 | — | — |
| | | Number of parts | 10 | — | 30 | — | — |
| MRC for matrix formation | First rubber | Type | — | — | ECO | SBR | NBR |
| | | Item name | — | — | 0N301 | T2003 | N2305V |
| | | Mooney viscosity | — | — | 32 | 33 | 32 |
| | | SP value | — | — | 18.5 | 17 | 20 |
| | | Number of parts | — | — | 100 | 100 | 100 |
| | Zinc oxide | Number of parts | — | — | — | 5 | 5 |
| | Zinc stearate | Number of parts | — | — | 1.4 | 1 | 1 |
| | Filler | Type | — | — | — | #7360 | #7360 |
| | | Number of parts | — | — | — | 40 | 60 |
| Rubber composition | CMB | Number of parts | 100 | 100 | 32 | 25 | 25 |
| | MRC | Number of parts | 0 | 0 | 68 | 75 | 75 |
| | Vulcanizing agent | Type | Sulfur | Sulfur | 25-B-40 | Sulfur | Sulfur |
| | | Number of parts | 1.8 | 3 | 2.5 | 3 | 3 |
| | Vulcanization accelerator 1 | Type | TS | TBZTD | TA1C-M60 | TBZTD | TBZTD |
| | | Number of parts | 1 | 1 | 1.5 | 1 | 1 |
| | Vulcanization accelerator 2 | Type | DM | TBSI | — | TBSI | TBZTD |
| | | Number of parts | 1 | 1 | — | 1 | 1 |

| Electrophotographic electro-conductive member | | | Comparative Example 6 C6 | Comparative Example 7 C7 | Comparative Example 8 C8 | Comparative Example 9 C9 |
|---|---|---|---|---|---|---|
| CMB for domain formation | Second rubber | Rubber type | BR | IR | NBR | Vulcanized rubber particle obtained by vulcanizing and freeze- |
| | | Abbreviation | 150B | IR2200L | N215SL | |
| | | Mooney viscosity | 16.8 | 70 | 45 | |
| | | SP value | 16.8 | 16.5 | 21.7 | |
| | | Number of parts | 100 | 100 | 100 | |

TABLE 6-continued

| | | | | | | |
|---|---|---|---|---|---|---|
| | Electro-conductive agent | Abbreviation | #7360 | EC600JD | #7360 | grinding unvulcanized rubber composition of Comparative Example 2 |
| | | DBP | 87 | 360 | 87 | |
| | | Number of parts | 80 | 20 | 60 | |
| | Zinc oxide | Number of parts | 5 | 5 | 5 | |
| | Zinc stearate | Number of parts | 1 | 1 | 1 | |
| | Additive | Abbreviation | — | — | AQ | |
| | | Number of parts | — | — | 30 | |
| | Filler | Abbreviation | — | — | — | |
| | | Number of parts | — | — | — | |
| | Plasticizer | Abbreviation | — | — | — | |
| | | Number of parts | — | — | — | |
| MRC for matrix formation | First rubber | Type | EPDM | SBR | EPDM | SBR |
| | | Item name | E505A | T2003 | E505A | T2003 |
| | | Mooney viscosity | 47 | 33 | 47 | 33 |
| | | SP value | 16 | 17 | 16 | 17 |
| | | Number of parts | 100 | 100 | 100 | 100 |
| | Zinc oxide | Number of parts | 5 | 5 | 5 | 5 |
| | Zinc stearate | Number of parts | 1 | 1 | 1 | 1 |
| | Filler | Type | — | — | #30 | #30 |
| | | Number of parts | — | — | 40 | 40 |
| Rubber composition | CMB | Number of parts | 45 | 25 | 30 | 25 |
| | MRC | Number of parts | 55 | 75 | 70 | 75 |
| | Vulcanizing agent | Type | Sulfur | Sulfur | Sulfur | Sulfur |
| | | Number of parts | 3 | 3 | 3 | 3 |
| | Vulcanization accelerator 1 | Type | EP-60 | TBZTD | EP-60 | TBZTD |
| | | Number of parts | 3 | 1 | 3 | 1 |
| | Vulcanization accelerator 2 | Type | — | TBSI | — | TBSI |
| | | Number of parts | — | 0.5 | — | 1 |

The materials shown in Table 6 are as follows.

CG102: epichlorohydrin rubber (EO-EP-AGE, terpolymer) (product name: EPICHLOMER CG102, SP value: 18.5 $(J/cm^3)^{0.5}$, manufactured by OSAKA SODA)

LV: quaternary ammonium salt (product name: ADEKA CIZER LV70, manufactured by ADEKA CORPORATION)

P202: aliphatic polyester-based plasticizer (product name: Polycizer P-202, manufactured by DIC CORPORATION)

MB: 2-mercaptobenzimidazole (product name: NOCRAC MB, manufactured by OUCHI SHINKO CHEMICAL INDUSTRIAL CO., LTD.)

TS: tetramethylthiuram monosulfide (product name: NOCCELOR TS, manufactured by OUCHI SHINKO CHEMICAL INDUSTRIAL CO., LTD.)

DM: di-2-benzothiazolyl disulfide (DM) (product name: NOCCELOR DM-P(DM), manufactured by OUCHI SHINKO CHEMICAL INDUSTRIAL CO., LTD.)

EC600JD: Ketjen black (product name: Ketjen black EC600JD, manufactured by Lion Specialty Chemicals Co., Ltd.)

PW380: paraffin oil (product name: PW-380, manufactured by Idemitsu Kosan Co., Ltd.)

25-B-40: 2,5-dimethyl-2,5-di(t-butylperoxy)hexyne (product name: PERHEXA 25B-40, manufactured by NOF CORPORATION)

TAIC-M60: triallyl isocyanurate (product name: TAIC-M60, manufactured by Mitsubishi Chemical Corporation)

Next, according to the following method, a two-layered electrophotographic electro-conductive member C1 obtained by providing a surface layer on the electro-conductive layer of the obtained electro-conductive roller was prepared, and evaluations were carried out as in Example 1. The evaluation results are shown in Table 8.

First, methyl isobutyl ketone was added to a caprolactone-modified acrylic polyol solution to adjust a solid content thereof to 10 mass %. With respect to 1,000 parts by mass of the acrylic polyol solution (solid content: 100 parts by mass), a mixed solution was prepared by using the materials shown in Table 7. In this case, a mixture of a block HDI and a block IPDI was "NCO/OH=1.0".

TABLE 7

| | Material name | Amount (Parts by mass) |
|---|---|---|
| Main agent | Caprolactone-modified acrylic polyol solution (solid content: 70 mass %) (product name: PLACCEL DC2016, manufactured by Daicel Corporation) | 100 (Solid content) |
| Curing agent 1 | Block isocyanate A (IPDI, solid content: 60 mass %) (product name: VESTANAT B1370, manufactured by Evonik Japan Co., Ltd.) | 37 (Solid content) |
| Curing agent 2 | Block isocyanate B (HDI, solid content: 80 mass %) (product name: DURANATE TPA-B80E, manufactured by Asahi Kasei Corporation) | 24 (Solid content) |
| Electron conductive agent | Carbon black (HAP) (product name: Seast3, manufactured by Tokai Carbon Co., Ltd.) | 15 |
| Additive 1 | Needle-like rutile type titanium dioxide particle (product name: MT-100T, manufactured by TAYCA CORPORATION) | 35 |
| Additive 2 | Modified dimethylsilicone oil (product name: DOWSIL SH28 Paint Additive, manufactured by Dow Corning Toray Silicone Co., Ltd.) | 0.1 |

Next, 210 g of the mixed solution placed in a 450 mL glass bottle and 200 g of glass beads as media having an average particle size of 0.8 mm were mixed, and the mixture was dispersed for 24 hours using a paint shaker dispersing machine, thereby obtaining a coating material for surface layer formation.

Coating by a dipping method was performed by immersing the obtained electro-conductive roller in the coating material for surface layer formation with its longitudinal direction as a vertical direction. An immersion time of the dipping coating was set to 9 seconds, a pulling speed was set so that an initial speed became 20 mm/sec and a final speed became 2 mm/sec, and the speed was linearly changed during this time. The obtained coated product was dried at room temperature for 30 minutes, dried in a hot-air circulating dryer set to 90° C. for 1 hour, and dried in a hot-air circulating dryer set to 160° C. for 1 hour.

TABLE 8

| | Comparative Example 1 | Comparative Example 2 | Comparative Example 3 | Comparative Example 4 | Comparative Example 5 |
|---|---|---|---|---|---|
| Electrophotographic electro-conductive member | C1 | C2 | C3 | C4 | C5 |
| Domain proportion (mass %) | 100 | 100 | 32 | 25 | 25 |
| Matrix volume resistivity (Ω · cm) | — | — | 1.44E+07 | 1.87E+07 | 9.18E+04 |
| Impedance (Ω) | 5.60E+07 | 2.03E+07 | 1.60E+06 | 2.70E+04 | 1.80E+05 |
| Matrix-domain structure | Absence | Absence | Presence | Presence | Presence |
| Domain satisfying requirement (B1) number % | — | — | 58 | 89 | 84 |
| Domain satisfying requirement (B2) number % | — | — | 26 | 92 | 90 |
| Domain unevenness shape [A/B] | — | — | 1.1 | 1.07 | 1.06 |
| Height of convex shape of domain | — | — | 130 | 150 | 125 |
| Average maximum Feret's diameter (μm) | — | — | 7.0 | 2.1 | 4.0 |
| Domain-to-domain distance | — | — | 5.0 | 0.8 | 1.4 |
| CB average wall-to-wall distance (nm) | — | — | 131 | 113 | — |
| Coefficient of variation σ· m/C | — | — | 0.4 | 0.3 | — |
| Proportion of cross-sectional area of CB to cross-sectional area of domain | — | — | 19.8 | 27.8 | — |
| SP value difference | — | — | 2.5 | 3.0 | 3.0 |
| Polishing condition | Condition 1 | Condition 1 | Condition 1 | Condition 1 | Condition 1 |

| | Comparative Example 6 | Comparative Example 7 | Comparative Example 8 | Comparative Example 9 |
|---|---|---|---|---|
| Electrophotographic electro-conductive member | C6 | C7 | C8 | C9 |
| Domain proportion (mass %) | 45 | 25 | 30 | 25 |
| Matrix volume resistivity (Ω · cm) | 3.80E+16 | 9.00E+14 | 2.10E+16 | 9.50E+13 |
| Impedance (Ω) | 4.50E+05 | 7.50E+05 | 1.40E+06 | 4.60E+06 |
| Matrix-domain structure | Absence | Presence | Presence | Presence |
| Domain satisfying requirement (B1) number % | — | 25 | 0 | 0 |
| Domain satisfying requirement (B2) number % | — | 27 | 0 | 0 |
| Domain unevenness shape [A/B] | — | 1.3 | 1.7 | 1.6 |
| Height of convex shape of domain | — | 130 | 150 | 165 |
| Average maximum Feret's diameter (μm) | — | 2.3 | 8.7 | 9.2 |
| Domain-to-domain distance | — | 1.5 | 5.5 | 6.4 |
| CB average wall-to-wall distance (nm) | — | 132 | 112 | 115 |
| Coefficient of variation σ· m/C | — | 0.5 | 0.3 | 0.4 |
| Proportion of cross-sectional area of CB to cross-sectional area of domain | — | 15.3 | 27.8 | 27.5 |
| SP value difference | 0.8 | 0.5 | 5.7 | 3.0 |
| Polishing condition | Condition 1 | Condition 1 | Condition 1 | Condition 1 |

In the present Comparative Example, the electrophotographic electro-conductive member C1 has a two-layered structure including an ion conductive electro-conductive layer and an electron conductive surface layer, but the surface layer has no matrix-domain structure. Therefore, dispersion uniformity of the electro-conductive particles is reduced, an electric field concentration is generated, and an excessive charge is likely to flow through an electro-conductive path. As a result, the number of fogging on the paper was 95.

Comparative Example 2

An electrophotographic electro-conductive member C2 was prepared and evaluated as in Example 1, except that the CMB for domain formation was changed as shown in Table 6, and the MRC for matrix formation was not used. The evaluation results are shown in Table 8.

In the present Comparative Example, since the electro-conductive layer of the electrophotographic electro-conductive member C2 has no matrix-domain structure, and is formed of only domain materials, an electric field concentration is generated in the electro-conductive layer, and an excessive charge is likely to flow through the electroconductive path. As a result, the number of fogging on the paper was 121, and a remarkable fogging was confirmed in the image.

Comparative Example 3

An electrophotographic electro-conductive member C3 was prepared and evaluated as in Example 1, except that the CMB for domain formation and the MRC for matrix formation were changed as shown in Table 6. The evaluation results are shown in Table 8.

In the present Comparative Example, since the electrophotographic electro-conductive member C3 includes domains and a matrix, but has a small number of domains satisfying the requirements (B1) and (B2), and has a distorted domain shape, an excessive charge migration occurs due to an electric field concentration caused by the domain shape. As a result, the number of fogging on the paper was 103.

Comparative Example 4

An electrophotographic electro-conductive member C4 was prepared and evaluated as in Example 1, except that the CMB for domain formation and the MRC for matrix formation were changed as shown in Table 6. The evaluation results are shown in Table 8.

In the present Comparative Example, since an electro-conductive particle is added to a matrix of the electrophotographic electro-conductive member C4, a volume resistivity of the matrix is small, the electrophotographic electro-conductive member has a single electro-conductive path, and an excessive charge is likely to flow through the electro-conductive path due to the generation of an electric field concentration in the electro-conductive layer. As a result, the number of fogging on the paper was 110.

Comparative Example 5

An electrophotographic electro-conductive member C5 was prepared and evaluated as in Example 1, except that the CMB for domain formation and the MRC for matrix formation were changed as shown in Table 6. The evaluation results are shown in Table 8.

In the present Comparative Example, the electrophotographic electro-conductive member C5 has a matrix-domain structure. However, since an electro-conductive agent is not added to a domain, a volume resistivity of the domain is high, and since an electro-conductive particle is added to a matrix, a volume resistivity of the matrix is low. That is, since the electrophotographic electro-conductive member has a single electro-conductive path, an electric field concentration is generated in the electro-conductive layer, and thus an excessive charge is likely to flow through the electro-conductive path. As a result, the number of fogging on the paper was 105.

Comparative Example 6

An electrophotographic electro-conductive member C6 was prepared and evaluated as in Example 1, except that the CMB for domain formation and the MRC for matrix formation were changed as shown in Table 6. The evaluation results are shown in Table 8.

In the present Comparative Example, the electrophotographic electro-conductive member C6 has no matrix-domain structure, and has a co-continuous structure including an electro-conductive phase and an insulating phase. That is, since the electrophotographic electro-conductive member has a single electro-conductive path, an electric field concentration is generated in the electro-conductive layer, and thus an excessive charge is likely to flow through the electro-conductive path. As a result, the number of fogging on the paper surface was 107.

Comparative Example 7

An electrophotographic electro-conductive member C7 was prepared and evaluated as in Example 1, except that the CMB for domain formation and the MRC for matrix formation were changed as shown in Table 6. The evaluation results are shown in Table 8.

In the present Comparative Example, the electrophotographic electro-conductive member C7 has a matrix-domain structure, but 80% or less of domains satisfying the requirements (B1) and (B2) were observed. It is considered that the reason is that the amount of carbon black added to the domain is small, and the amount of carbon gel could not be sufficient, and thus the domain shape did not become a circular shape, and unevenness or an aspect ratio was increased. As a result, an electric field concentration is generated in the electro-conductive layer, an excessive charge is likely to flow an electro-conductive path. As a result, the number of fogging on the paper was 97.

Comparative Example 8

An electrophotographic electro-conductive member C8 was prepared and evaluated as in Example 1, except that the CMB for domain formation and the MRC for matrix formation were changed as shown in Table 6. The evaluation results are shown in Table 8.

In the present Comparative Example, the electrophotographic electro-conductive member C8 has a matrix-domain structure, and 0% of domains satisfying the requirements (B1) and (B2) were observed. It is considered that the reason is the following 2 points.

(1) Since silica having a reinforcing property is added to the domain, a viscosity of carbon masterbatch forming the domain is large, and a viscosity difference between the carbon masterbatch and the rubber composition for matrix formation is large.

(2) An SP value difference between the first rubber and the second rubber is large.

Therefore, it is considered that the domain shape did not become a circular shape, and unevenness or an aspect ratio was increased. As a result, an electric field concentration is generated in the electro-conductive layer, an excessive charge is likely to flow an electro-conductive path. As a result, the number of fogging on the paper was 132, and a remarkable fogging was confirmed.

Comparative Example 9

An electrophotographic electro-conductive member C9 was prepared and evaluated as in Example 1, except that the CMB for domain formation was changed to a rubber particle obtained by freeze-grinding the rubber for electro-conductive layer formation of Comparative Example 2 after heating and vulcanizing the rubber for electro-conductive layer formation alone, and the MRC for matrix formation was changed as shown in Table 6. The evaluation results are shown in Table 8.

In the present Comparative Example, the electrophotographic electro-conductive member C9 had a matrix-domain structure, and 0% of domains satisfying the requirements (B1) and (B2) were observed. The reason is that a size of the particle formed by the freeze-grinding is large, and anisotropic electro-conductive rubber particles are dispersed. As a result, an electric field concentration is generated in the electro-conductive layer, an excessive charge is likely to flow an electro-conductive path. As a result, the number of fogging on the paper was 126, and a remarkable fogging was confirmed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A process for producing an electrophotographic electro-conductive member, comprising:

a support having an electro-conductive outer surface; and an electro-conductive layer on the outer surface of the support;

the electro-conductive layer having a matrix with domains dispersed therein;

the matrix comprising a cross-linked product of a first rubber;

the domains each including a cross-linked product of a second rubber and an electro-conductive particle, at least some of the domains being exposed to an outer surface of the electrophotographic electro-conductive member to constitute protrusions on the outer surface of the electrophotographic electro-conductive member;

the outer surface of the electrophotographic electro-conductive member comprising the matrix and the domains that are exposed to the outer surface of the electrophotographic electro-conductive member, wherein the electrophotographic electro-conductive member has an impedance of $1.0\times10^3$ to $1.0\times10^8\Omega$ obtained by applying an alternating current voltage having an amplitude of 1 V and a frequency of 1.0 Hz between the outer surface of the support and a platinum electrode directly provided on the outer surface of the electrophotographic electro-conductive member under an environment of a temperature of 23° C. and a relative humidity of 50%, and when defining a length of the electro-conductive layer in a longitudinal direction as L and a thickness of the electro-conductive layer as T, obtaining cross sections of the electro-conductive layer in a thickness direction thereof at a center position of the electro-conductive layer in the longitudinal direction and two positions corresponding to L/4 from both ends of the electro-conductive layer to the center of the electro-conductive layer in the longitudinal direction, and assuming that three observation areas each having a 15 μm square are arbitrary put in a thickness region of each of the cross sections between a depth of 0.1 T to 0.9 T from the outer surface of the electro-conductive layer, 80% or more of domains observed in the respective nine observation areas in total satisfy the following requirements (1) and (2):

(1) a proportion of a cross-sectional area of the electro-conductive particle included in a domain to be judged among the domains included in the observation areas to a cross-sectional area of the domain is 20% or more; and (2) AB is 1.00 to 1.10, where A is a perimeter of the domain, and B is an envelope perimeter of the domain, the process comprising the steps of:

providing a rubber mixture for forming the domains, including carbon black and the second rubber by kneading the carbon black and the second rubber;

providing a rubber mixture for forming the matrix, including the first rubber;

kneading the rubber mixture for forming the domains and the rubber mixture for forming the matrix to prepare a rubber composition having a matrix-domain structure;

forming a layer of the rubber composition on a surface of the electroconductive support; and curing the layer of the rubber composition on the surface of the electroconductive support, and then grinding a surface of the layer of the rubber composition which has been cured so as to expose the domains to the outer surface of the electrophotographic electro-conductive member to constitute protrusions on the outer surface of the electrophotographic electro-conductive member.

2. The process for forming an electrophotographic electro-conductive member according to claim 1, wherein a difference in an absolute value of solubility parameter between the first rubber and the second rubber, is 0.4 to 4.0 $(J/cm^3)^{0.5}$.

3. The process for forming an electrophotographic electro-conductive member according to claim 1, wherein the matrix has a volume resistivity ρm of $1.0\times10^8$ to $1.0\times10^{17}$ Ω·cm.

4. The process for forming an electrophotographic electro-conductive member according to claim 1, wherein the domains satisfying requirements (1) and (2) have an average maximum Feret's diameter Df of 0.1 to 5.0 μm.

5. The process for forming an electrophotographic electro-conductive member according to claim 1, wherein the proportion satisfying requirement (1) is 25 to 30%.

6. The process for forming an electrophotographic electro-conductive member according to claim 1, wherein the electro-conductive particle is carbon black.

7. The process for forming an electrophotographic electro-conductive member according to claim 6, wherein the carbon black has a DBP adsorption amount of 40 to 80 $cm^3/100$ g.

8. The process for forming an electrophotographic electro-conductive member according to claim 6, wherein the carbon black included in each of the domains satisfying requirements (1) and (2) have an arithmetic mean wall-to-wall distance C of 110 to 130 nm, and σ·m/C is 0.0 to 0.3 where a standard deviation of a wall-to-wall distance of the carbon black is defined as σ·m.

9. The process for forming an electrophotographic electro-conductive member according to claim 1, wherein each of the protrusions has a height of 50 to 200 nm.

10. The process for forming an electrophotographic electro-conductive member according to claim 1, wherein an arithmetic mean wall-to-wall distance Dm of the domains exposed to an outer surface of the electrophotographic electro-conductive member to constitute the protrusions is 2.00 μm or less.

11. The process for forming an electrophotographic electro-conductive member according to claim 1, wherein the matrix has a volume resistivity ρm of $1.0\times10^{10}$ to $1.0\times10^{17}$ Ω·cm.

12. The process for forming an electrophotographic electro-conductive member according to claim 1, wherein the matrix has a volume resistivity ρm of $1.0\times10^{12}$ to $1.0\times10^{17}$ Ω·cm.

* * * * *